US011575622B2

(12) United States Patent
Yang et al.

(10) Patent No.: US 11,575,622 B2
(45) Date of Patent: Feb. 7, 2023

(54) CANNED ANSWERS IN MESSAGES

(71) Applicant: Apple Inc., Cupertino, CA (US)

(72) Inventors: Lawrence Y. Yang, Bellevue, WA (US); Giulia Pagallo, Cupertino, CA (US); Linden B. Siahaan, San Jose, CA (US); Justin Wood, Los Altos, CA (US); Roberto Garcia, Santa Clara, CA (US); Jerome Rene Bellegarda, Saratoga, CA (US); Tiffany S. Jon, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 16/875,836

(22) Filed: May 15, 2020

(65) Prior Publication Data

US 2020/0314039 A1 Oct. 1, 2020

Related U.S. Application Data

(63) Continuation of application No. 14/719,163, filed on May 21, 2015, now abandoned.
(Continued)

(51) Int. Cl.
*H04L 51/02* (2022.01)
*G06F 3/048* (2013.01)
(Continued)

(52) U.S. Cl.
CPC ............ *H04L 51/02* (2013.01); *G06F 3/0481* (2013.01); *G06F 3/0484* (2013.01);
(Continued)

(58) Field of Classification Search
CPC ..... H04L 51/02; H04L 51/06; G06F 16/3322; G06F 16/3329; G06F 16/24578;
(Continued)

(56) References Cited

U.S. PATENT DOCUMENTS 5,946,647 A 8/1999 Miller et al.
6,323,846 B1 11/2001 Westerman et al.
(Continued)

FOREIGN PATENT DOCUMENTS

AU 2015100705 A4 6/2015
CN 1248744 A 3/2000
(Continued)

OTHER PUBLICATIONS

Decision of Rejection received for Chinese Patent Application No. 201510291041.5, dated Feb. 27, 2019, 14 pages (3 pages of English Translation and 11 pages of Official Copy).
(Continued)

*Primary Examiner* — Jennifer N Welch
*Assistant Examiner* — Qi Wan
(74) *Attorney, Agent, or Firm* — Dentons US LLP

(57) ABSTRACT

At an electronic device with a touch-sensitive display, display a message transcript, where the message transcript includes at least one message from at least a first user. Determine, based at least in-part on the at least one message, a plurality of suggested one or more characters. Display, on the touch-sensitive display, the plurality of suggested one or more characters. Detect an input on the touch-sensitive display. Determine whether the input represents user selection of one of the plurality of suggested one or more characters. Display the selected one of the plurality of suggested one or more characters in the message transcript. Send the selected one or more characters to the first user.

42 Claims, 30 Drawing Sheets

Related U.S. Application Data

(60) Provisional application No. 62/129,790, filed on Mar. 7, 2015, provisional application No. 62/005,958, filed on May 30, 2014.

(51) Int. Cl.
    *G06F 3/0481*     (2022.01)
    *G06F 3/0484*     (2022.01)
    *G06F 16/332*     (2019.01)
    *G06F 16/2457*     (2019.01)
    *G06F 3/0488*     (2022.01)
    *G06F 3/04886*     (2022.01)
    *G06F 40/274*     (2020.01)
    *G06F 40/279*     (2020.01)
    *G06Q 10/10*     (2012.01)

(52) U.S. Cl.
    CPC ........ *G06F 3/0488* (2013.01); *G06F 3/04886* (2013.01); *G06F 16/24578* (2019.01); *G06F 16/3322* (2019.01); *G06F 16/3329* (2019.01); *G06F 40/274* (2020.01); *G06F 40/279* (2020.01); *G06Q 10/10* (2013.01)

(58) Field of Classification Search
    CPC ...... G06F 40/279; G06F 40/274; G06F 3/048; G06Q 10/10; G06Q 10/107; G06N 5/048
    See application file for complete search history.

(56) References Cited

U.S. PATENT DOCUMENTS

| | | |
|---|---|---|
| 6,349,299 B1 | 2/2002 | Spencer et al. |
| 6,570,557 B1 | 5/2003 | Westerman et al. |
| 6,677,932 B1 | 1/2004 | Westerman |
| 7,657,849 B2 | 2/2010 | Chaudhri et al. |
| 7,890,996 B1 | 2/2011 | Chauhan et al. |
| 8,074,172 B2 | 12/2011 | Kocienda et al. |
| 8,078,978 B2 | 12/2011 | Perry et al. |
| 8,232,973 B2 | 7/2012 | Kocienda et al. |
| 8,255,810 B2 | 8/2012 | Moore et al. |
| 8,502,856 B2 | 8/2013 | Jeong et al. |
| 8,832,584 B1* | 9/2014 | Agarwal ............ G06F 15/0283 715/776 |
| 8,903,718 B2 | 12/2014 | Akuwudike |
| 8,996,639 B1* | 3/2015 | Faaborg ................ H04L 51/02 709/206 |
| 9,304,675 B2* | 4/2016 | Lemay .............. H04M 1/27475 |
| 2002/0015024 A1 | 2/2002 | Westerman et al. |
| 2003/0078981 A1 | 4/2003 | Harms et al. |
| 2004/0181586 A1* | 9/2004 | Morreale .............. H04L 51/00 709/206 |
| 2004/0186848 A1 | 9/2004 | Kobashikawa et al. |
| 2005/0080855 A1* | 4/2005 | Murray ................. H04L 51/00 709/206 |
| 2005/0190059 A1 | 9/2005 | Wehrenberg |
| 2006/0017692 A1 | 1/2006 | Wehrenberg et al. |
| 2006/0025091 A1 | 2/2006 | Buford |
| 2006/0267931 A1 | 11/2006 | Vainio et al. |
| 2007/0125860 A1 | 6/2007 | Lapstun et al. |
| 2008/0009300 A1 | 1/2008 | Vuong |
| 2008/0126075 A1 | 5/2008 | Thorn |
| 2008/0126314 A1 | 5/2008 | Thorn et al. |
| 2008/0133479 A1 | 6/2008 | Zelevinsky et al. |
| 2008/0235242 A1 | 9/2008 | Swanburg et al. |
| 2008/0270559 A1 | 10/2008 | Milosavljevic et al. |
| 2008/0281643 A1 | 11/2008 | Wertheimer et al. |
| 2009/0106695 A1 | 4/2009 | Perry et al. |
| 2009/0149204 A1 | 6/2009 | Riley et al. |
| 2009/0174667 A1* | 7/2009 | Kocienda ............ G06F 3/04895 345/169 |
| 2010/0088302 A1* | 4/2010 | Block .................... H04L 51/38 707/706 |
| 2010/0123724 A1 | 5/2010 | Moore et al. |
| 2010/0248757 A1 | 9/2010 | Baek et al. |
| 2010/0287241 A1* | 11/2010 | Swanburg ............ G06Q 10/107 709/206 |
| 2010/0291948 A1 | 11/2010 | Wu et al. |
| 2010/0312838 A1 | 12/2010 | Lyon et al. |
| 2010/0323730 A1 | 12/2010 | Karmarkar |
| 2011/0105190 A1 | 5/2011 | Cha et al. |
| 2011/0111730 A1* | 5/2011 | McEvoy ............ H04M 3/42195 455/408 |
| 2011/0201387 A1* | 8/2011 | Paek ..................... G06F 3/0237 455/566 |
| 2011/0249073 A1* | 10/2011 | Cranfill ................. G06F 3/0488 348/14.02 |
| 2011/0302249 A1 | 12/2011 | Orr et al. |
| 2012/0079373 A1 | 3/2012 | Kocienda et al. |
| 2012/0096389 A1 | 4/2012 | Flam et al. |
| 2012/0136855 A1 | 5/2012 | Ni et al. |
| 2012/0173222 A1 | 7/2012 | Wang et al. |
| 2012/0278765 A1 | 11/2012 | Kuwahara et al. |
| 2013/0204897 A1 | 8/2013 | Mcdougall |
| 2013/0253906 A1 | 9/2013 | Archer et al. |
| 2013/0275923 A1 | 10/2013 | Griffin et al. |
| 2013/0297317 A1 | 11/2013 | Lee et al. |
| 2013/0300645 A1 | 11/2013 | Fedorov |
| 2013/0339283 A1 | 12/2013 | Grieves et al. |
| 2014/0025371 A1 | 1/2014 | Min et al. |
| 2014/0033071 A1* | 1/2014 | Gruber ............ G06Q 10/06311 715/752 |
| 2014/0040406 A1 | 2/2014 | Oiiiia et al. |
| 2014/0163954 A1 | 6/2014 | Joshi et al. |
| 2014/0215397 A1* | 7/2014 | Bilinsky ................ G06F 3/0237 715/816 |
| 2014/0278379 A1 | 9/2014 | Coccaro et al. |
| 2014/0282211 A1 | 9/2014 | Ady et al. |
| 2014/0317502 A1 | 10/2014 | Brown et al. |
| 2015/0100537 A1* | 4/2015 | Grieves ................ G06N 5/04 706/52 |
| 2015/0188861 A1* | 7/2015 | Esplin ..................... H04L 51/06 709/206 |
| 2015/0222586 A1 | 8/2015 | Ebersman et al. |
| 2015/0347534 A1 | 12/2015 | Gross et al. |
| 2015/0347985 A1 | 12/2015 | Gross et al. |
| 2015/0350118 A1 | 12/2015 | Yang et al. |
| 2016/0359771 A1 | 12/2016 | Sridhar |
| 2017/0010769 A1 | 1/2017 | Gross et al. |
| 2017/0011354 A1 | 1/2017 | Gross et al. |
| 2017/0011355 A1 | 1/2017 | Gross et al. |
| 2017/0075878 A1 | 3/2017 | Jon et al. |

FOREIGN PATENT DOCUMENTS

| | | |
|---|---|---|
| CN | 1413008 A | 4/2003 |
| CN | 101247366 A | 8/2008 |
| CN | 101326523 A | 12/2008 |
| CN | 101895623 A | 11/2010 |
| CN | 102055832 A | 5/2011 |
| CN | 102289431 A | 12/2011 |
| CN | 103079008 A | 5/2013 |
| CN | 103377276 A | 10/2013 |
| CN | 205038557 U | 2/2016 |
| EP | 0987641 A2 | 3/2000 |
| EP | 2393046 A1 | 12/2011 |
| EP | 2688014 A1 | 1/2014 |
| EP | 2713323 A1 | 4/2014 |
| EP | 2770762 A1 | 8/2014 |
| GB | 2412546 A | 9/2005 |
| GB | 2470585 A | 12/2010 |
| JP | 2005-32160 A | 2/2005 |
| WO | 1999/16181 A1 | 4/1999 |
| WO | 2015/087084 A1 | 6/2015 |
| WO | 2015/183699 A1 | 12/2015 |

OTHER PUBLICATIONS

Office Action received for Chinese Patent Application No. 201510291041.5, dated Jul. 24, 2017, 22 pages (6 pages of English Translation and 16 pages of official copy).

(56) References Cited

OTHER PUBLICATIONS

Office Action received for Chinese Patent Application No. 201510291041.5, dated Jul. 31, 2020, 14 pages (3 pages of English Translation and 11 pages of Official Copy).
Office Action received for Chinese Patent Application No. 201510291041.5, dated May 24, 2018, 18 pages (3 pages of English Translation and 15 pages of Official Copy).
Search Report and Opinion received for Netherlands Patent Application No. 2017005, dated Sep. 5, 2018, 13 pages (Official Copy Only) (See Communication under 37 CFR § 1.98(a) (3)).
Search Report received for Netherlands Patent Application No. 2017007, dated Jan. 8, 2019, 15 pages (5 pages of English Translation and 10 pages of Official Copy).
Search Report received for Netherlands Patent Application No. 2017009, dated Jan. 8, 2019, 12 pages (2 pages of English Translation and 10 pages of Official Copy).
Shangjun Chen, "English Grammar Vocabulary Explanation for Junior High School", Published by Southeast University, Mar. 2013, 8 pages (1 page of English Translation and 7 pages of Official Copy).
Decision on Appeal received for U.S. Appl. No. 14/719,163, mailed on Mar. 18, 2020, 14 pages.
Decision to Grant received for Danish Patent Application No. PA201570316, dated Jul. 7, 2016, 2 pages.
Decision to Grant received for Danish patent Application No. PA201670430, dated Jul. 18, 2017, 2 pages.
Examiner's Answer to Appeal Brief received for U.S. Appl. No. 14/719,163, dated May 17, 2018, 48 pages.
Extended European Search Report received for European Patent Application No. 16190190.5, dated Feb. 27, 2017, 7 pages.
Extended European Search Report received for European Patent Application No. 16190201.0, dated Mar. 24, 2017, 7 Pages.
Extended European Search Report received for European Patent Application No. 16190204.4, dated Mar. 24, 2017, 7 pages.
Final Office Action received for U.S. Appl. No. 14/719,163, dated Apr. 20, 2017, 36 pages.
Final Office Action received for U.S. Appl. No. 14/719,163, dated Feb. 26, 2016, 37 pages.
Intention to Grant received for Danish Patent Application No. PA201570316, dated Feb. 19, 2016, 3 pages.
Intention to Grant Received for Danish patent Application No. PA201670430, dated May 8, 2017, 2 pages.
International Preliminary Report on Patentability received for PCT Patent Application No. PCT/US2015/032055, dated Dec. 15, 2016, 15 pages.
International Preliminary Report on Patentability received for PCT Patent Application No. PCT/US2015/033023, dated Dec. 15, 2016, 11 pages.
International Search Report and Written Opinion received for PCT Patent Application No. PCT/US2015/032055, dated Oct. 15, 2015, 21 pages.
International Search Report and Written Opinion received for PCT Patent Application No. PCT/US2015/033023, dated Aug. 12, 2015, 14 pages.
International Search Report and Written Opinion received for PCT Patent Application No. PCT/US2016/025418, dated Jul. 1, 2016, 20 pages.
International Search Report and Written Opinion received for PCT Patent Application No. PCT/US2016/048044, dated Oct. 31, 2016, 9 pages.
Invitation to Pay Additional Fees received for PCT Patent Application No. PCT/US2015/032055, dated Aug. 6, 2015, 9 pages.
IPHONEBLOG, "[iPhone-Game] The Secret of Monkey Island: Special Edition", Available at <https://www.youtube.com/watch?v=2YuxCWA0sEg>, Jul. 23, 2009, 2 pages.
Non-Final Office Action received for U.S. Appl. No. 14/719,163, dated Oct. 20, 2016, 36 pages.
Non-Final Office Action received for U.S. Appl. No. 14/719,163, dated Sep. 25, 2015, 37 pages.
Notice of Allowance received for Chinese Patent Application No. 201520364899.5, dated Jan. 12, 2016, 5 pages.
Notice of Allowance received for Taiwanese Patent Application No. 104117505, dated Jun. 30, 2017, 3 pages.
Office Action received for Australian Patent Application No. 2015100705, dated Jul. 20, 2015, 6 pages.
Office Action received for Australian Patent Application No. 2015100705, dated Jan. 13, 2016, 3 pages.
Office Action received for Australian Patent Application No. 2015266840, dated Mar. 27, 2017, 3 Pages.
Office Action received for Danish Patent Application No. PA201570316, dated Aug. 28, 2015, 8 pages.
Office Action received for Danish Patent Application No. PA201670430, dated Oct. 27, 2016, 7 pages.
Office Action received for Netherland Patent Application No. 2016997, dated Feb. 6, 2017, 12 pages.
Office Action received for Netherlands Patent Application No. 2014870, dated Feb. 1, 2016, 13 pages.
Office Action received for Taiwanese Patent Application No. 104117505, dated Sep. 23, 2016, 17 pages.
Office Action received for Taiwanese Patent Application No. 104117530, dated Mar. 2, 2017, 13 pages.
Quick Starter Guide, Rogerthat Enterprise, available at <http://www.rogerthat.net/guide/quick-starter-guide/>, 2014, 4 pages.
Record of Oral Hearing received for U.S. Appl. No. 14/719,163, mailed on Mar. 24, 2020, 15 pages.
Search Report and Opinion received for Netherlands Patent Application No. 2016996, dated Jun. 23, 2017, 8 pages.
Search Report and Opinion received for Netherlands Patent Application No. 2017011, dated Jun. 23, 2017, 8 pages.
Search Report and Opinion received for Netherlands Patent Application No. 2017012, dated Jun. 23, 2017, 9 pages.
Smith Shamblesguru, "Handwrite a Google Search on an iPad", Available at <https://www.youtube.com/watch?v=2zIQ20whYak>, Jul. 28, 2012, 2 pages.
Tomic et al., "Emoticons", FIP—Journal of Finance and Law, vol. 1, No. 1, 2013, pp. 35-42.
WhatsApp, available at <http://web.archive.org/web/20140122054942/http://www.whatsapp.com/>, Jan. 22, 2014, 2 pages.
Search Report received for Netherlands Patent Application No. 2017002, dated Apr. 30, 2021, 14 pages (6 pages of English Translation and 8 pages of Official Copy).
Search Report received for Netherlands Patent Application No. 2017003, dated Apr. 23, 2021, 27 pages (19 pages of English Translation and 8 pages of Official copy).

\* cited by examiner

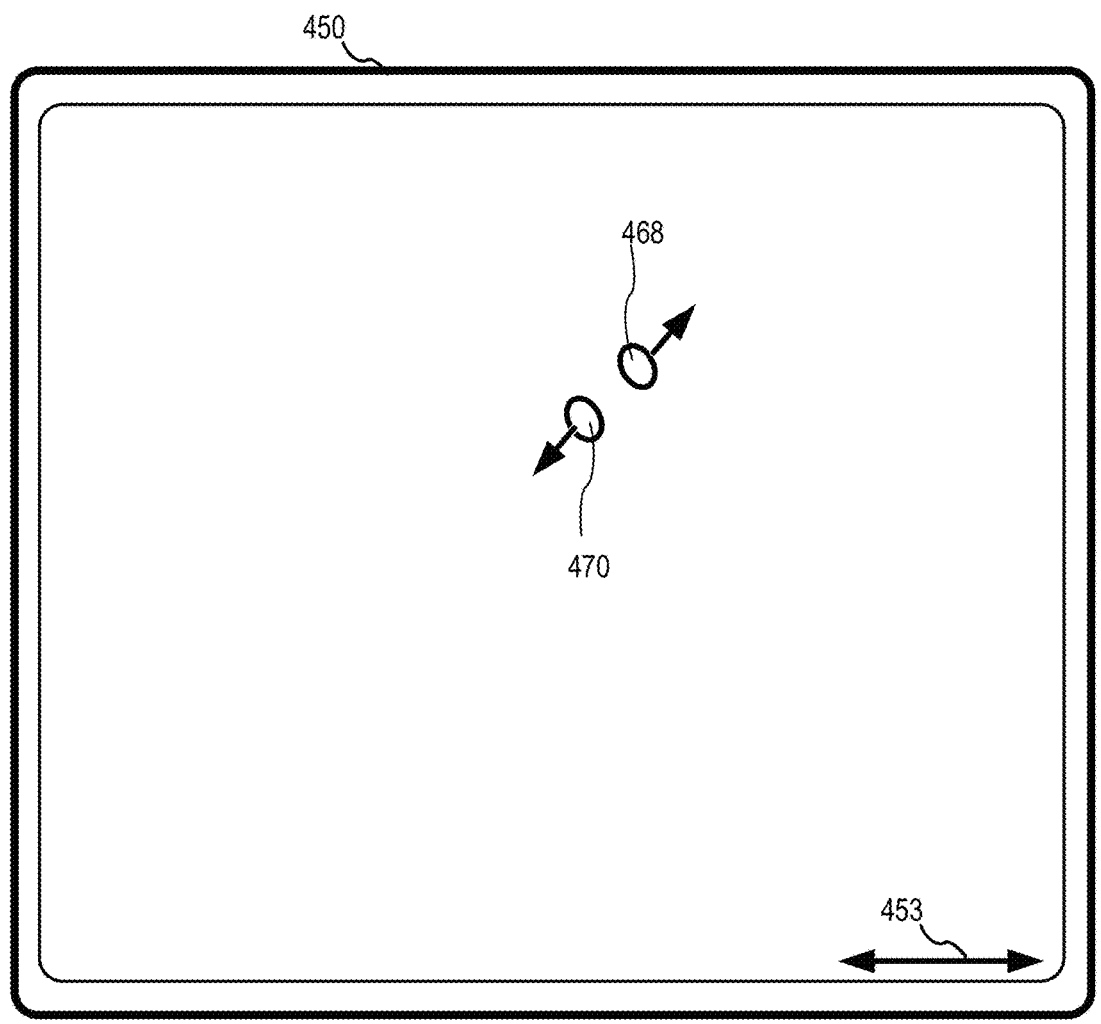
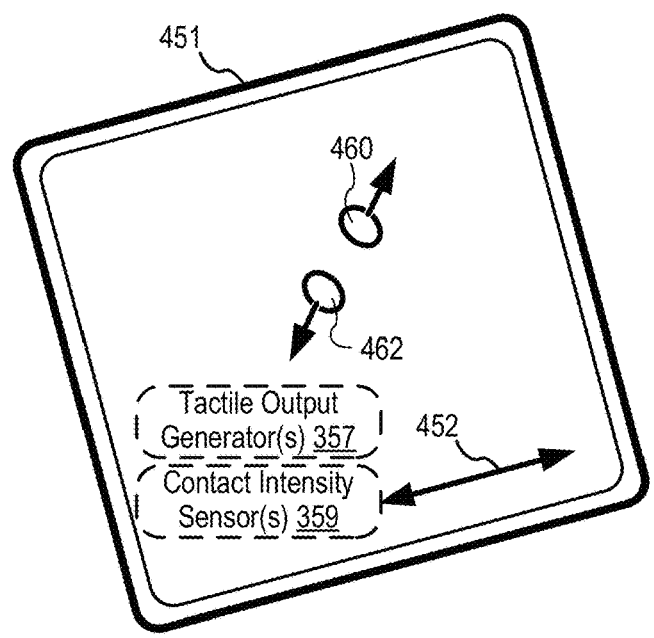
*FIG. 4B*

700

702 display a message transcript, the message transcript including at least one message from at least a first user

704 determine, based at least in-part on the at least one message, a plurality of suggested one or more characters

706 display, on the touch-sensitive display, the plurality of suggested one or more characters

708 detect an input on the touch-sensitive display

710 determine whether the input represents user selection of one of the plurality of suggested one or more character

712 in accordance with a determination that the input represents user selection of one of the plurality of suggested one or more characters, display the selected one of the plurality of suggested one or more characters in the message transcript

802 display, in a first region of the display, a message transcript, the message transcript including at least one message from at least a first user

804 display, in a second region of the display, a virtual keyboard, the virtual keyboard including a number of character keys

806 display, in a third region of the display, a plurality of suggested one or more characters, the plurality of suggested characters determined based, at least in-part, on a content of the at least one message received from the first user > displaying the third region contiguous with the first region and the second region

808 detect input representing user selection of a suggested one or more characters from the displayed plurality of one or more characters

810 in response to detecting the input, displaying the selected suggested one or more characters into the message transcript in the first area

FIG. 8

CANNED ANSWERS IN MESSAGES

CROSS-REFERENCE TO RELATED APPLICATIONS

This application is a continuation of U.S. patent application Ser. No. 14/719,163, "Canned Answers in Messages," filed May 21, 2015, which claims the benefit of priority of U.S. Provisional Patent Application Ser. No. 62/005,958, "Canned Answers in Messages," filed May 30, 2014 and U.S. Provisional Patent Application Ser. No. 62/129,790, "Canned Answers in Messages," filed Mar. 7, 2015.

This application relates to the following provisional applications: U.S. Patent Application Ser. No. 62/005,837, "Device, Method, and Graphical User Interface for a Predictive Keyboard," filed May 30, 2014; U.S. Patent Application Ser. No. 62/046,876, "Device, Method, and Graphical User Interface for a Predictive Keyboard," filed Sep. 5, 2014; U.S. patent application Ser. No. 14/502,711, "Device, Method, and Graphical User Interface for a Predictive Keyboard," filed Sep. 30, 2014; U.S. Patent Application Ser. No. 62/005,825, "Entropy-Guided Text Prediction Using Combined Word and Character N-gram Language Models," filed May 30, 2014; U.S. Patent Application Ser. No. 62/006,010, "Predictive Text Input," filed May 30, 2014; and U.S. Patent Application Ser. No. 62/005,942, "Text Prediction Using Combined Word N-gram and Unigram Language Models," filed May 30, 2014. The content of these applications are hereby incorporated by reference in their entirety.

FIELD

The present disclosure relates generally to messaging, and more specifically to techniques for suggesting predictive answers that a user can select to respond to an incoming message.

BACKGROUND

Portable electronic devices, particularly cellular phones, are popular devices for message-based communications. Exemplary message-based communications include the short message service (SMS) and iMessage technologies provided by Apple Inc., of Cupertino, Calif. The small form factors of portable electronic devices, however, present user interface challenges. One persistent challenge arises from the reduced-size keyboards typically employed by these devices, which are sub-optimal for typing. This difficulty is exacerbated by continued improvement in electronics packaging techniques that lend to smaller devices with even less room for keyboard placement. Techniques for predicting a user's likely response to an incoming message—thereby reducing the need for manual user input—are thus desirable.

SUMMARY

In some embodiments, a method for responding to messages comprises: at an electronic device with a touch-sensitive display: displaying a message transcript, the message transcript including at least one message from at least a first user; determining, based at least in-part on the at least one message, a plurality of suggested one or more characters; displaying, on the touch-sensitive display, the plurality of suggested one or more characters; detecting an input on the touch-sensitive display; determining whether the input represents user selection of one of the plurality of suggested one or more characters; and in accordance with a determination that the input represents user selection of one of the plurality of suggested one or more characters, displaying the selected one of the plurality of suggested one or more characters in the message transcript.

In some embodiments, a method for responding to messages comprises: at an electronic device with a touch-sensitive display: at an electronic device with a touch-sensitive display: displaying, in a first region of the display, a message transcript, the message transcript including at least one message from at least a first user; displaying, in a second region of the display, a virtual keyboard, the virtual keyboard including a number of character keys; and displaying, in a third region of the display, a plurality of suggested one or more characters, the plurality of suggested characters determined based, at least in-part, on a content of the at least one message received from the first user.

In some embodiments, a method for responding to messages comprises: at an electronic device with a touch-sensitive display: displaying a message transcript, the message transcript including at least one message from at least a first user; determining, based at least in-part on the at least one message, a plurality of suggested one or more characters; and displaying a first suggested one or more characters of the plurality of suggested one or more characters in a first region on the touch-sensitive display, wherein the first region is a contiguous region visually distinguished from the background of the message transcript.

In some embodiments, a method for responding to messages comprises: at an electronic device with a touch-sensitive display: displaying a message transcript, the message transcript including at least one message from at least a first user; determining, based at least in-part on the at least one message, a plurality of suggested one or more characters; and displaying a first affordance representing a first suggested one or more characters of the plurality of suggested one or more characters at the bottom of the message transcript.

DESCRIPTION OF THE FIGURES

FIGS. 4A and 4B illustrate an exemplary user interface for a menu of applications on a portable multifunction device in accordance with some embodiments.

FIG. 7 is a flow diagram illustrating a process for transitioning between electronic devices.

FIG. 8 is a flow diagram illustrating a process for transitioning between electronic devices.

DETAILED DESCRIPTION

Figure 1A:
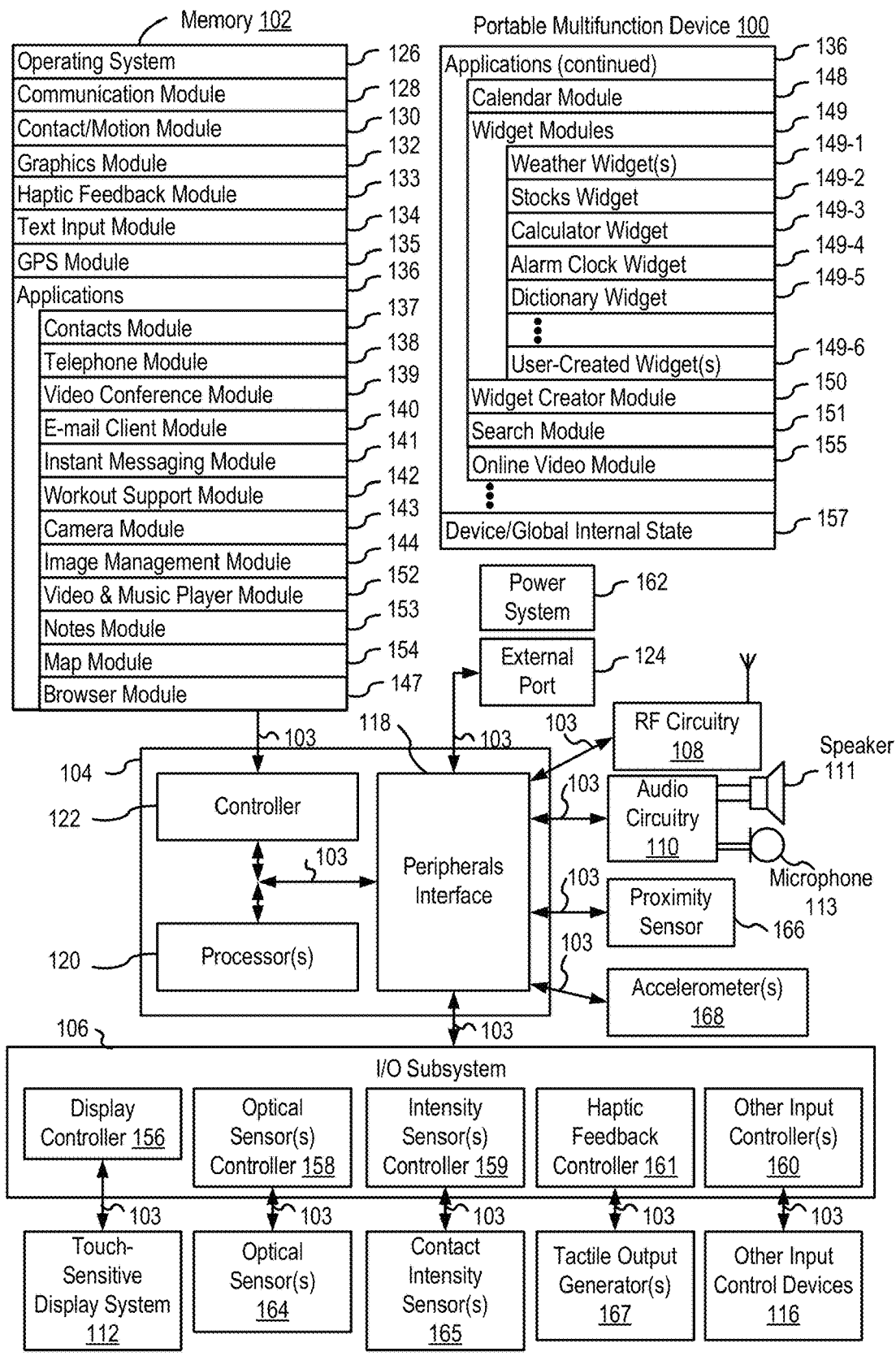
FIG. 1A is a block diagram illustrating a portable multifunction device with a touch-sensitive display in accordance with some examples.

In the following description of the disclosure and embodiments, reference is made to the accompanying drawings in which it is shown by way of illustration specific embodiments that can be practiced. It is to be understood that other embodiments and examples can be practiced and changes can be made without departing from the scope of the disclosure.

Below, FIGS. 1A-1B, 2, and 3 provide a description of exemplary devices for performing the techniques described herein. For brevity, these techniques may be referred to as "predictive answers" for responding to user messages. FIGS. 4A-4B, 5A-5J, and 6A-6E illustrate exemplary user interfaces for invoking predictive answers. The user interfaces in the figures are also used to illustrate the processes described below, including those processes in FIGS. 7-10.

Although the following description uses terms first, second, etc. to describe various elements, these elements should not be limited by the terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable devices, such as laptops or tablet computers with touch-sensitive surfaces (e.g., touch screen displays and/or touch pads), may also be used. Exemplary embodiments of laptop and tablet computers include, without limitation, the iPad® and MacBook® devices from Apple Inc. of Cupertino, Calif. It should also be understood that, in some embodiments, the device is not a portable communications device, but is a desktop computer. Exemplary embodiments of desktop computers include, without limitation, the Mac Pro® from Apple Inc. of Cupertino, Calif.

In the discussion that follows, an electronic device that includes a display and a touch-sensitive surface is described. It should be understood, however, that the electronic device optionally includes one or more other physical user-interface devices, such as button(s), a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1B:
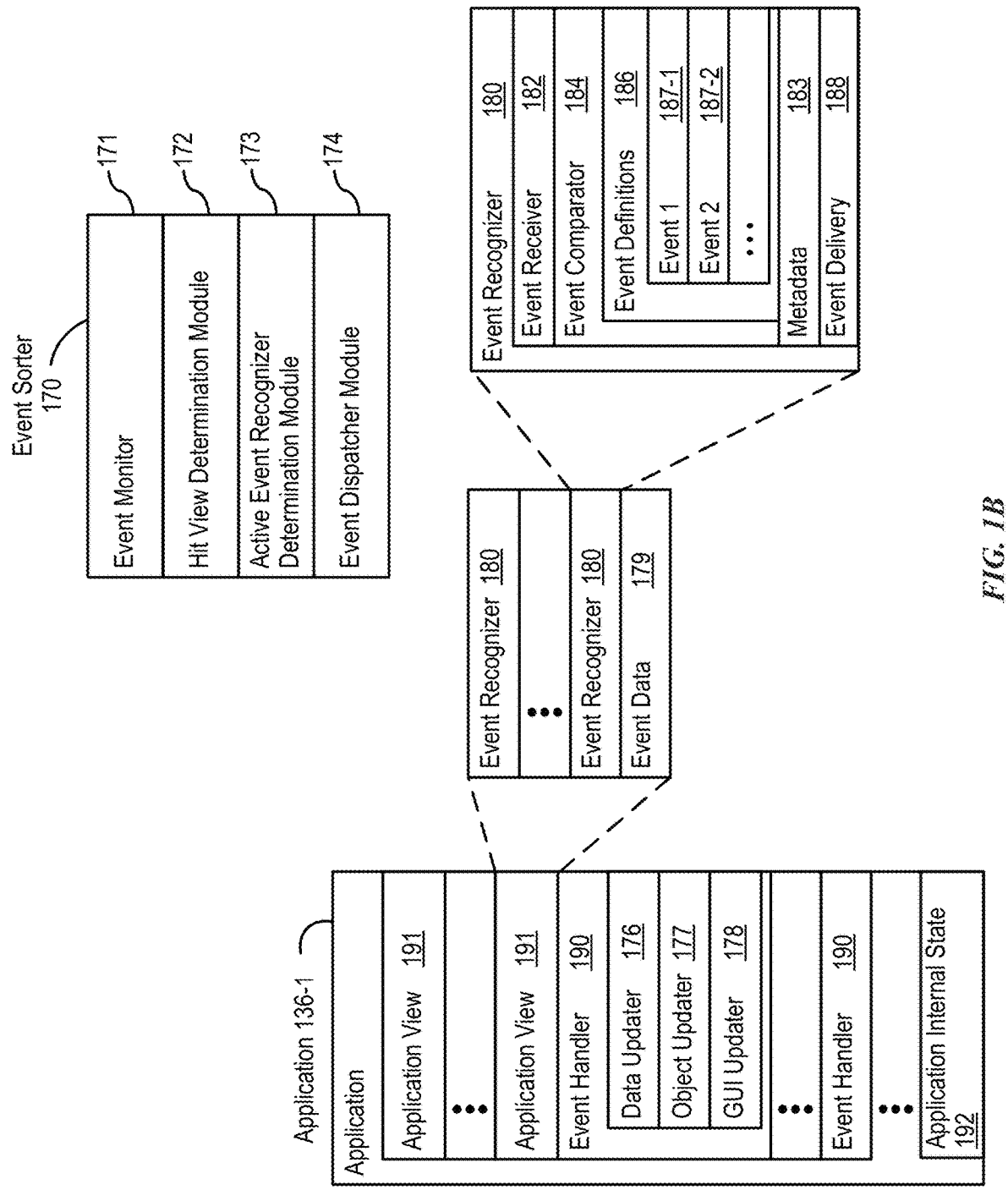
FIG. 1B is a block diagram illustrating exemplary components for event handling in accordance with some embodiments.

FIGS. 1A and 1B are block diagrams illustrating exemplary portable multifunction device 100 with touch-sensitive displays 112 in accordance with some embodiments. Touch-sensitive display 112 is sometimes called a "touch screen" for convenience. Device 100 may include memory 102. Device 100 may include memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. Bus/signal lines 103 may allow these components to communicate with one another. Device 100 is one example of an electronic device that could be used to perform the techniques described herein. Specific implementations involving device 100 may have more or fewer components than shown, may combine two or more components, or may have a different configuration or arrangement of the components. The various components shown in FIGS. 1A and 1B may be implemented in hardware, software, or a combination of both. The components also can be implemented using one or more signal processing and/or application specific integrated circuits.

Memory 102 may include one or more computer readable storage mediums. The computer readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web-pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
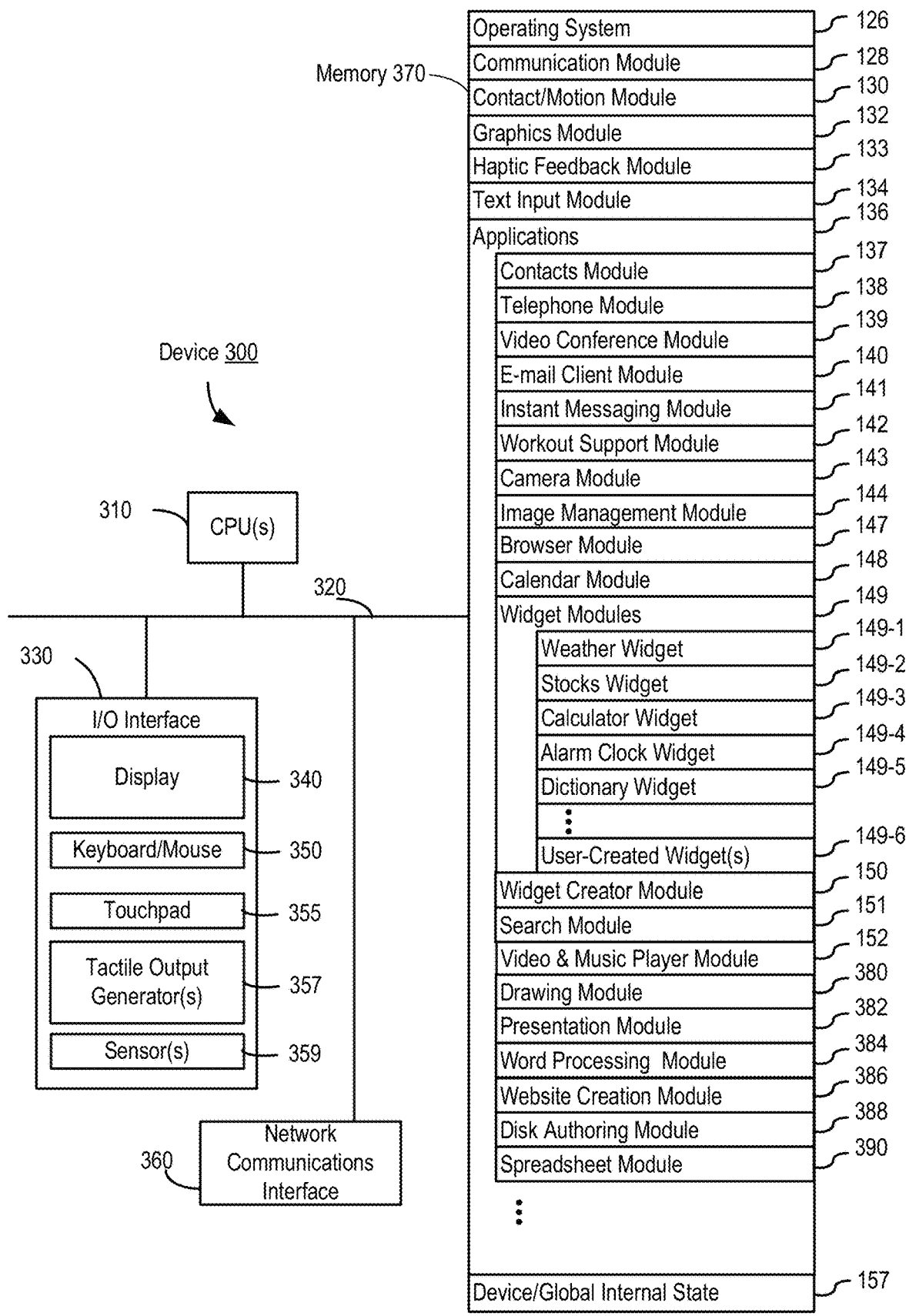
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin connector that is the same as, or similar to and/or compatible with the 8-pin and/or 30-pin connectors used on devices made by Apple Inc.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web-pages, icons (such as user-interface objects including soft keys), digital images, videos, animations and the like. In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:

- Contacts module 137 (sometimes called an address book or contact list);
- Telephone module 138;
- Video conferencing module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;

Video and music player module 152, which merges video player module and music player module;
Notes module 153;
Map module 154; and/or
Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact/motion module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web-pages or portions thereof, as well as attachments and other files linked to web-pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web-page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise rearranged in various embodiments. For example, video player module may be combined with music player module into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration). In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 187 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
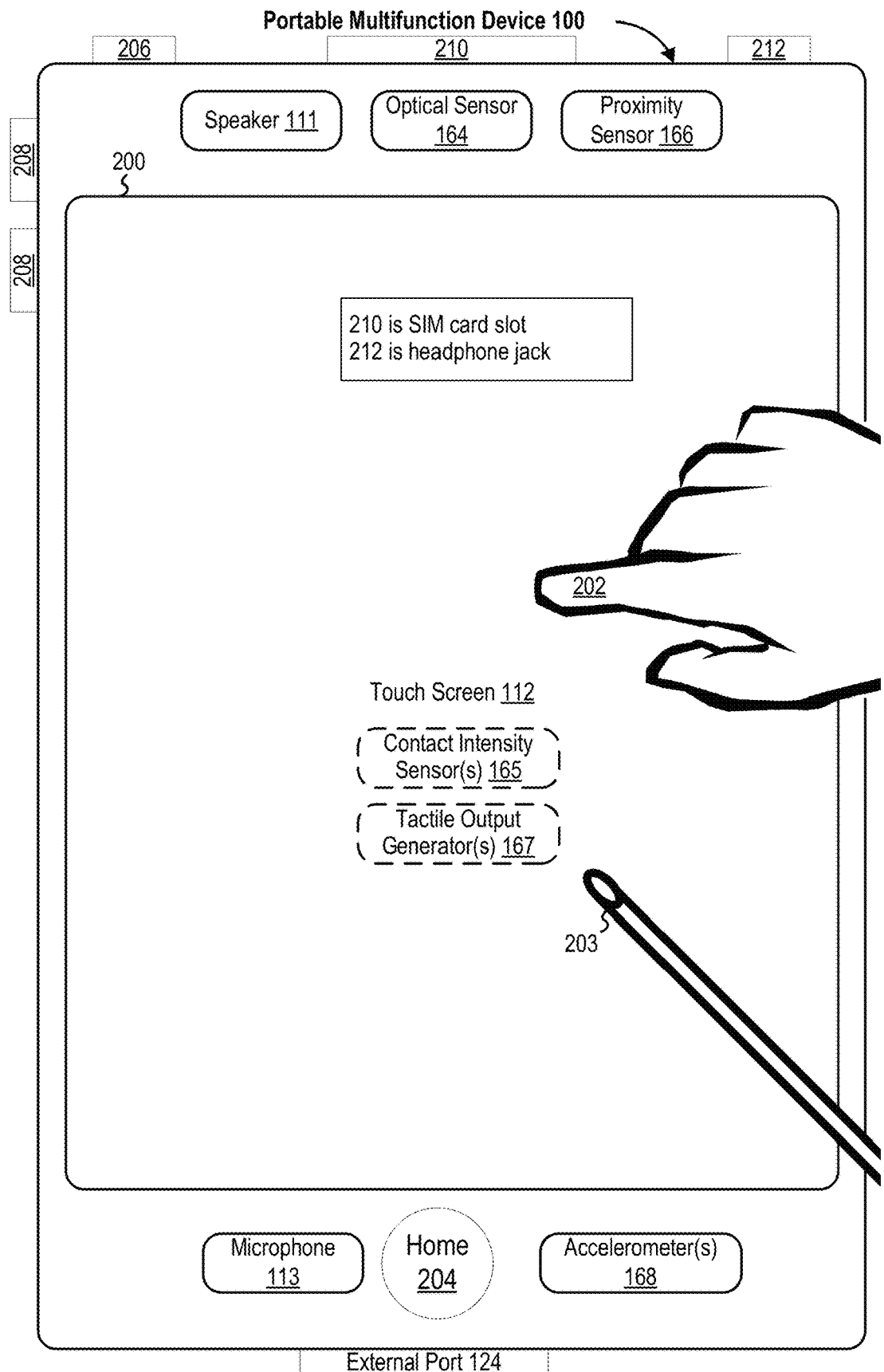
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval;

to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Figure 4A:
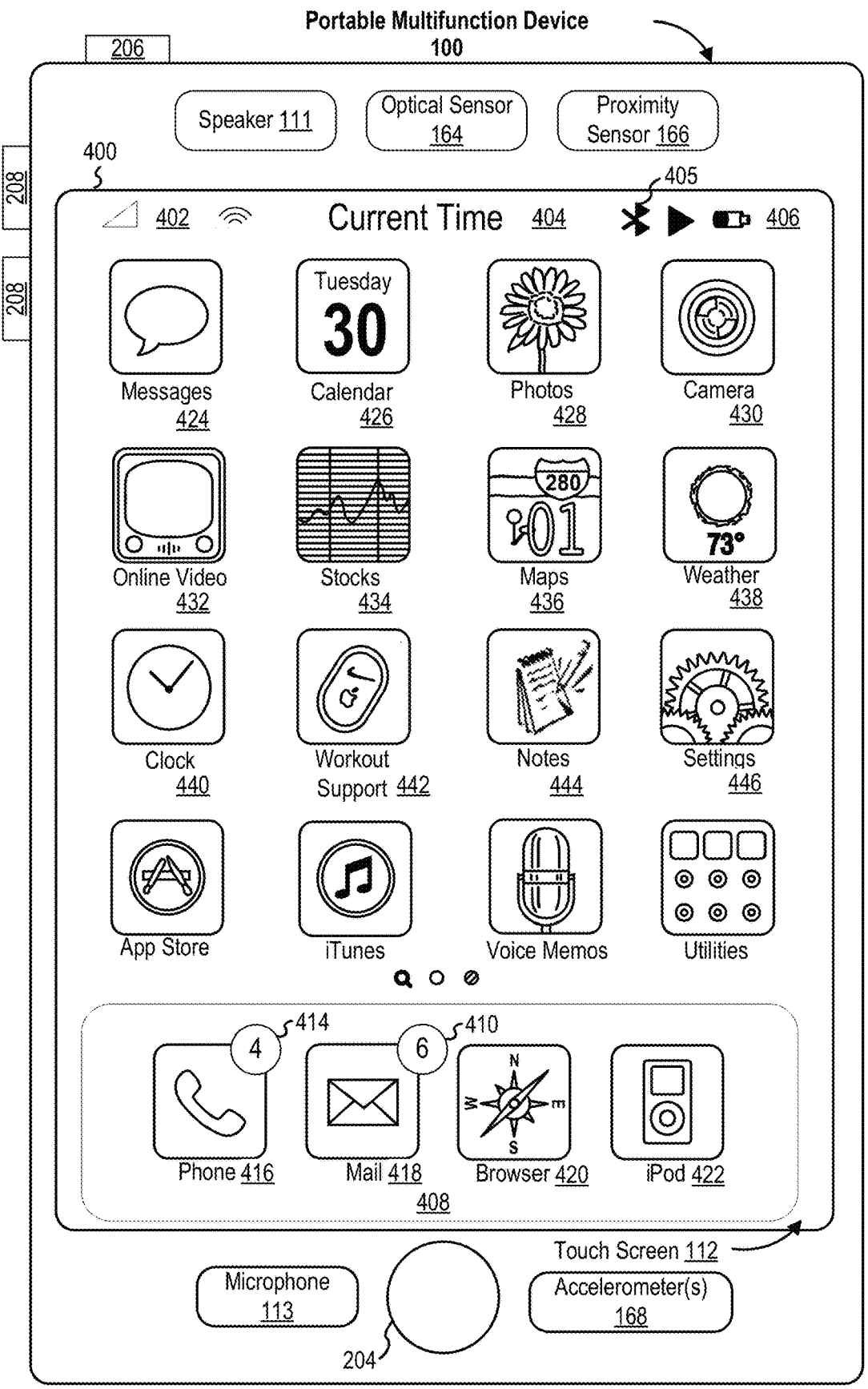

Attention is now directed towards embodiments of user interfaces ("UI") that may be implemented on portable multifunction device 100. FIG. 4A illustrates exemplary user interfaces for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
 Icon 416 for telephone module 138, labeled "Phone," which optionally includes an indicator 414 of the number of missed calls or voicemail messages;
 Icon 418 for e-mail client module 140, labeled "Mail," which optionally includes an indicator 410 of the number of unread e-mails;
 Icon 420 for browser module 147, labeled "Browser;" and
 Icon 422 for video and music player module 152, also referred to as iPod (trademark of Apple Inc.) module 152, labeled "iPod;" and
Icons for other applications, such as:
 Icon 424 for IM module 141, labeled "Messages;"
 Icon 426 for calendar module 148, labeled "Calendar;"
 Icon 428 for image management module 144, labeled "Photos;"
 Icon 430 for camera module 143, labeled "Camera;"
 Icon 432 for online video module 155, labeled "Online Video;"
 Icon 434 for stocks widget 149-2, labeled "Stocks;"
 Icon 436 for map module 154, labeled "Maps;"
 Icon 438 for weather widget 149-1, labeled "Weather;"
 Icon 440 for alarm clock widget 149-4, labeled "Clock;"
 Icon 442 for workout support module 142, labeled "Workout Support;"
 Icon 444 for notes module 153, labeled "Notes;" and
 Icon 446 for a settings application or module, labeled "Settings," which provides access to settings for device 100 and its various applications 136.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451) has a primary axis (e.g., 452) that corresponds to a primary axis (e.g., 453) on the display (e.g., 450). In accordance with these embodiments, the device detects contacts (e.g., 460 and 462) with the touch-sensitive surface 451 at locations that correspond to respective locations on the display (e.g., 460 corresponds to 468 and 462 corresponds to 470). In this way, user inputs (e.g., contacts 460 and 462, and movements thereof) detected by the device on the touch-sensitive surface (e.g., 451) are used by the device to manipulate the user interface on the display (e.g., 450) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used in the specification and claims, the term "open application" refers to a software application with retained state information (e.g., as part of device/global internal state 157 and/or application internal state 192). An open (e.g., executing) application is any one of the following types of applications:
- an active application, which is currently displayed on display 112 (or a corresponding application view is currently displayed on the display);
- a background application (or background process), which is not currently displayed on display 112, but one or more application processes (e.g., instructions) for the corresponding application are being processed by one or more processors 120 (i.e., running);
- a suspended application, which is not currently running, and the application is stored in a volatile memory (e.g., DRAM, SRAM, DDR RAM, or other volatile random access solid state memory device of memory 102); and
- a hibernated application, which is not running, and the application is stored in a non-volatile memory (e.g., one or more magnetic disk storage devices, optical disk storage devices, flash memory devices, or other non-volatile solid state storage devices of memory 102).

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that may be implemented on an electronic device with a display and a touch-sensitive surface, such as devices 100 and/or 300, to improve a user's experience in messaging applications. For brevity, the techniques described herein may be referred to as "predictive answers" or "canned answers". For purposes of this disclosure, a messaging application is a software application that supports the sending and receiving of messages between different users (e.g., participants). Messaging applications are sometimes referred to as "chat programs" or "chat rooms." A "message" refers to a piece of information that is sent to/from participants in a conversation. A message may contain one or more of the following types of information: text, an image (including icons and other affordances, whether interactive or not), a video, an audio clip, an emoji, and so forth. A "message transcript" refers to a listing of messages between the participant(s) of a message-based conversation.

Exemplary User Interfaces

Figure 5A:
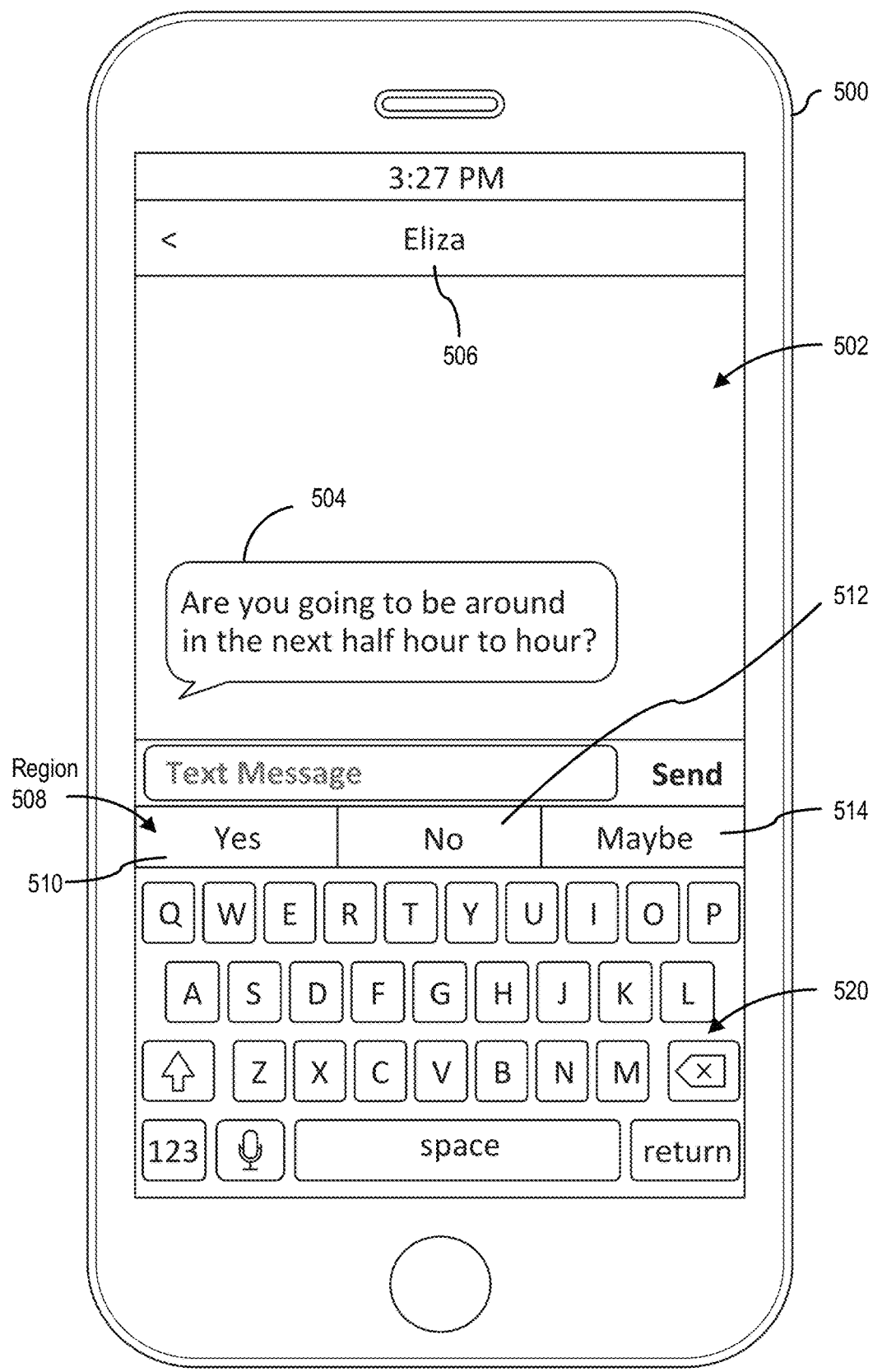
FIGS. 5A-5J illustrate exemplary user interfaces for responding to messages using predictive answers.
Figure 5B:
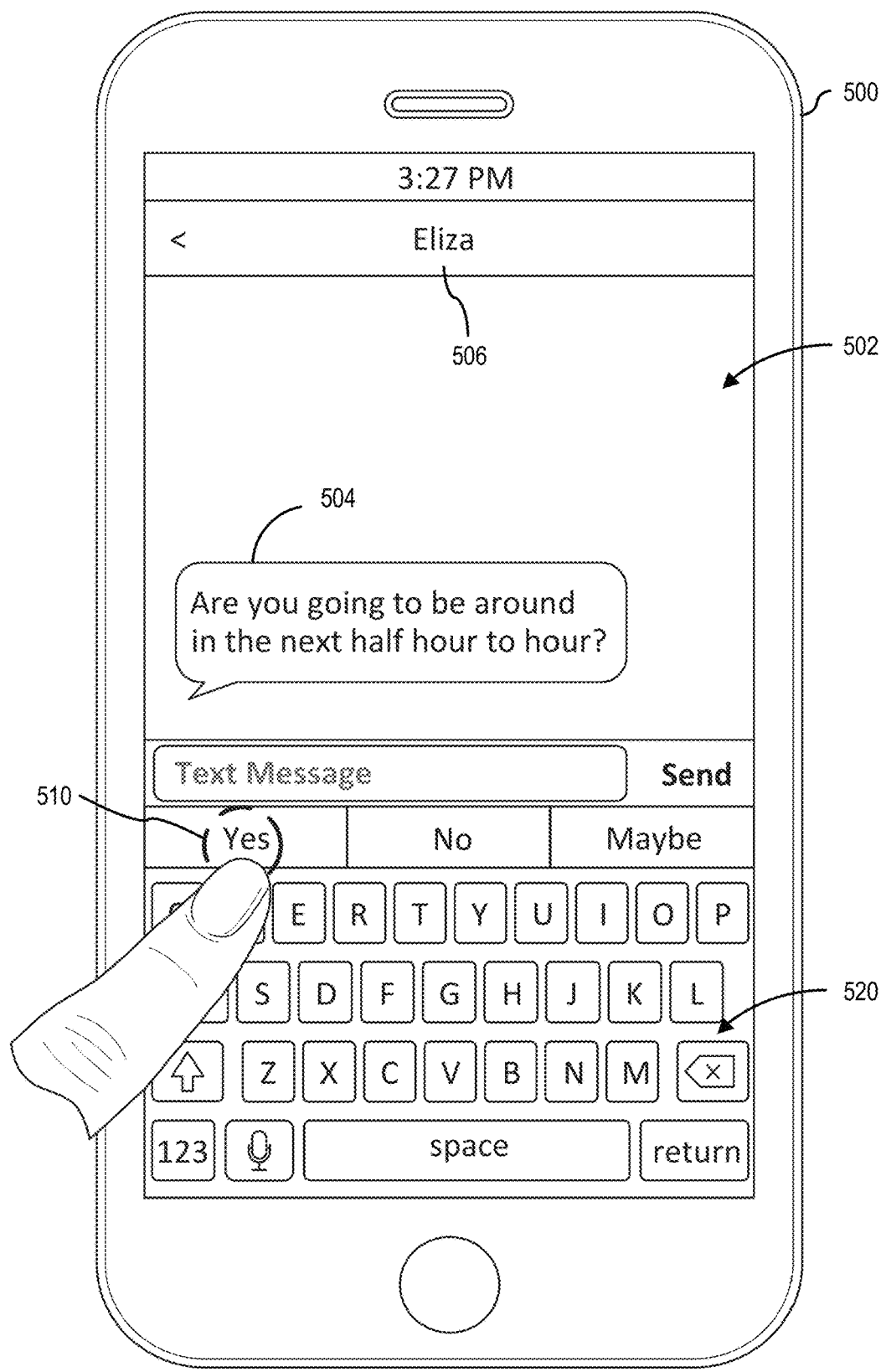
Figure 5C:
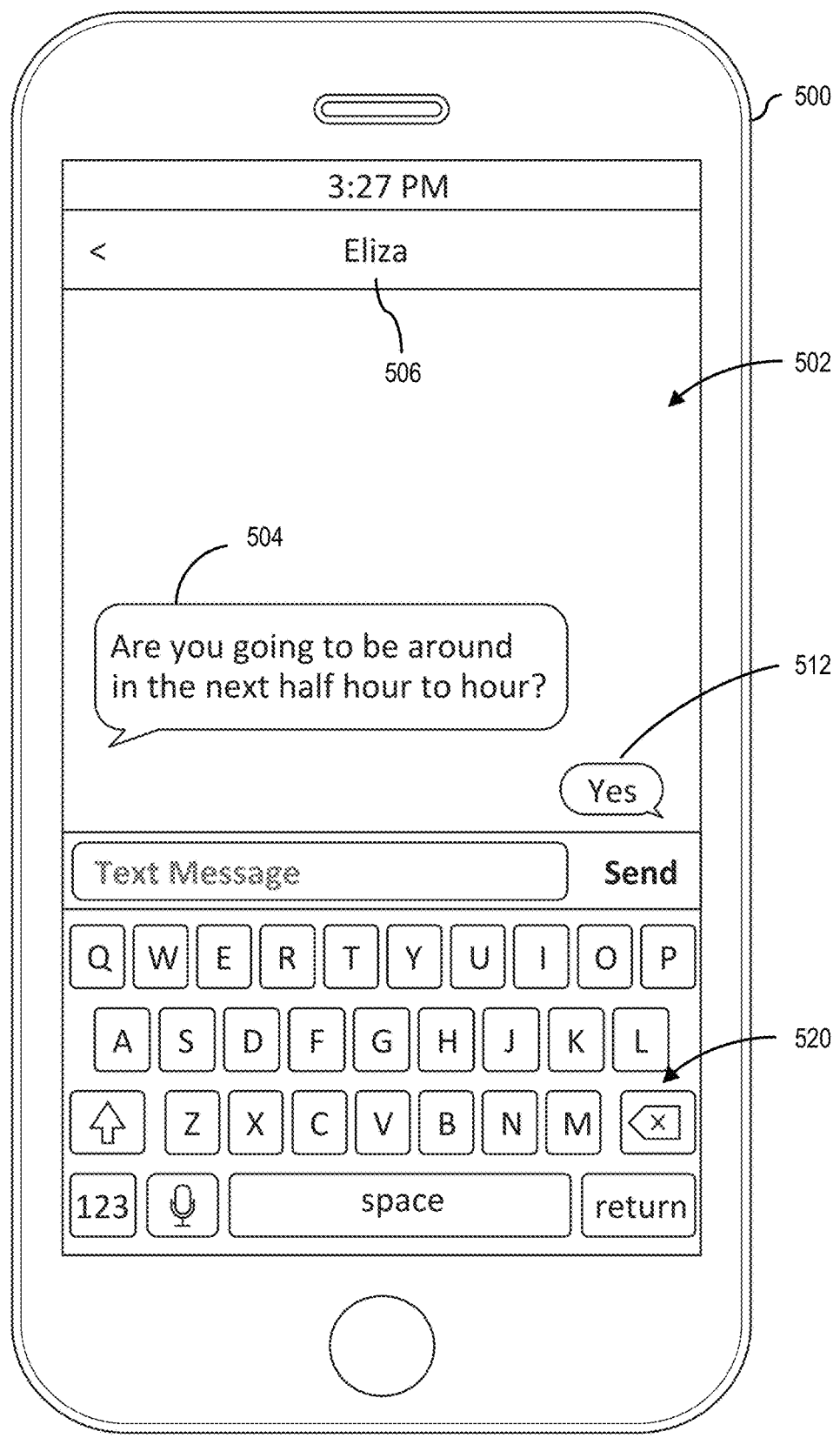
Figure 5D:
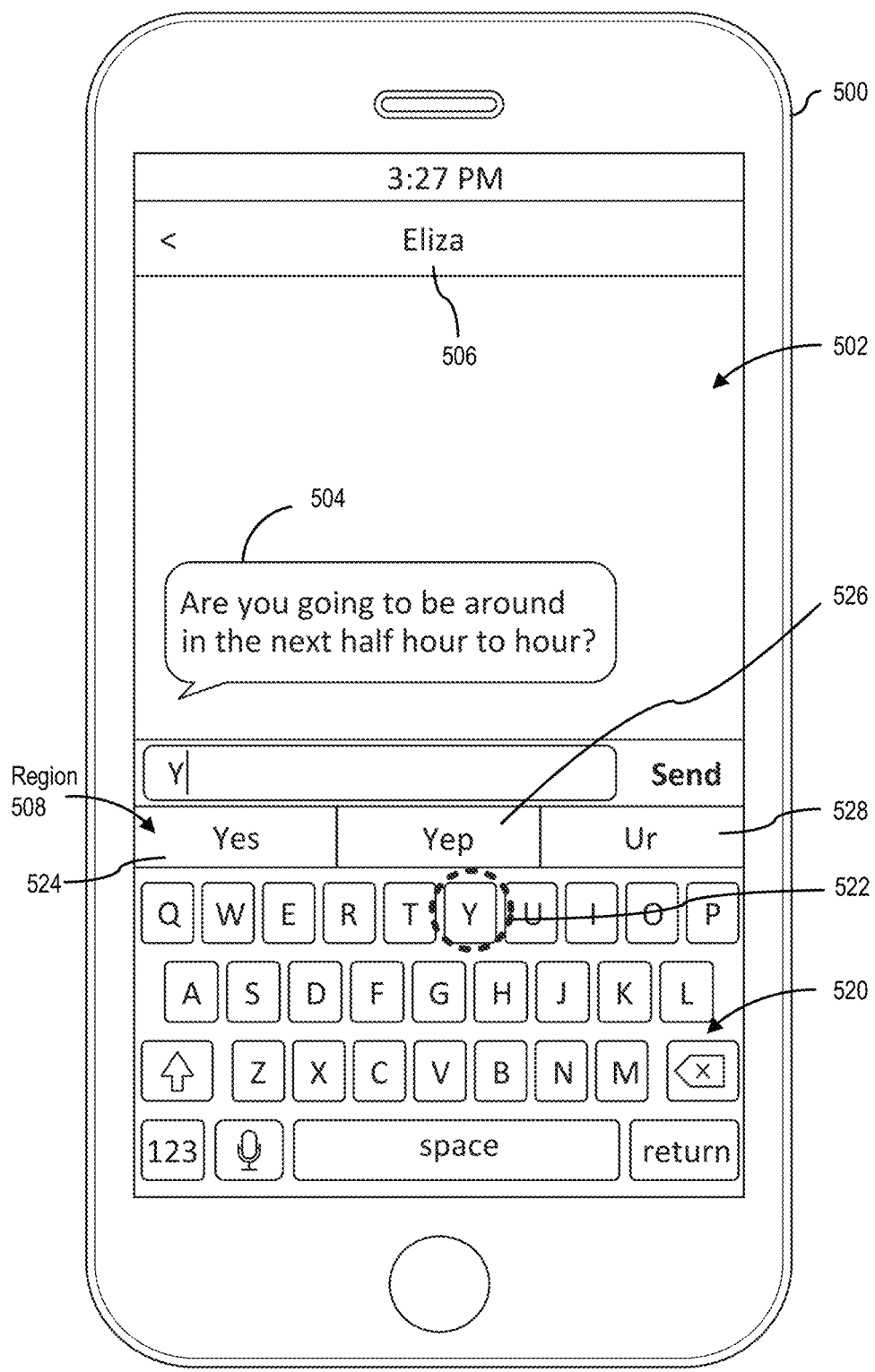

FIGS. 5A-5C demonstrate exemplary user interfaces that support predictive answers, used in some embodiments.

FIG. 5A shows electronic device 500. Electronic device 500 may be portable multifunction device 100 in some embodiments. Electronic device 500 may be multifunction device 300 in some embodiments. In the illustrated example, electronic device 500 is a cellular phone. Cellular phone 500 may display a user interface screen provided by a messaging software application. The user interface screen may have message transcript 502 showing a conversation between the user of device 500 and one or more participants, such as participant 506. Message transcript 502 may include message 504, received from (a device used by) participant 506.

The content of message 504—"are you going to be around in the next half hour to an hour?"—is a question. In linguistics parlance, this sentence constitutes an interrogatory. Device 500 is able to make this determination that message 504 contains an interrogatory. (As discussed in more detail below, the determination may be based on the verbiage "are you" appearing at the beginning of the message and the question mark at the end of the message.) On this basis, device 500 displays affordances 510, 512, and 514 horizontally across region 508. Affordances 510, 512, and 514 represent answers that device 500 predicts to be helpful to the user in responding to message 504. As shown, the suggested predictive answers include "yes," "no," and "maybe."

The user of device 500 may select one of the displayed affordances to send the corresponding predictive answer to participant 506. In some embodiments, the selection may be made through touch event(s) (e.g., a tap, a swipe, a flick, a hold, etc.). In some embodiments, the selection may be made through mouse event(s) (e.g., a hover, click, double-click, drag, etc.). In the example illustrated by FIG. 5B, the user selects affordance 510 (representing "yes") by contacting (e.g., tapping) the touch-sensitive display of device 500 at the location of affordance 510.

Turning to FIG. 5C, in response the selection of affordance 510, device 500 inserts the corresponding predictive answer ("yes") into message transcript 502. As shown, the answer "yes" is inserted into region 512. Device 500 may also send the predictive answer to the participant(s) of the on-going conversation, without requiring further user input. In this way, device 500 allows its user to respond to participant 506 quickly and meaningfully, in that the user was able to respond in a relevant manner without having to type out the reply manually.

Region 512 may have different visual appearances in different embodiments. In the illustrated embodiment, region 512 appears as a message bubble. The phrase "message bubble" is used here consistent with its ordinary meaning in the art to refer to graphic conventions representing a person's speech. Speech bubbles are also sometimes referred to as speech balloons and dialogue balloons. However, affordance 512 need not be limited to a speech bubble; in some embodiments (not shown), region 512 may take on a geometric shape, such as a rectangle having rounded corners or may be presented as plain text without a geometric container. More generally speaking, in some embodiments, region 512 may be a contiguous display region that is distinct from the background of message transcript 502.

Predictive answer functionalities provide multiple benefits. The availability of predictive answers reduces the cognitive and physical burden on a user who is conversing with other participant(s) in a message conversation, thereby improving user experience and efficiency. In addition to improving user experience, predictive answers can also reduce processor and battery power otherwise wasted on processing the multiple user inputs that would be required to input a responsive message.

Nevertheless, sometimes, it is necessary for a user to type out a more detailed response to an incoming message. Device 500 provides virtual keyboard 520 for this purpose. For example, in response to message 504 (FIG. 5A), the user may wish to clarify that she can stay for 45 minutes, which neither a half hour to a full hour as prompted by message 504. While providing predictive answers, device 500 can also accommodate the additional input modalities of keyboard input. Turning back to FIG. 5A, device 500 may display both virtual keyboard 520 and predictive answers simultaneously. Indeed, in the example of FIG. 5A, region 508 for invoking predictive answers is displayed contiguous with virtual keyboard 520. As a result, a user who is able to reach one input modality (e.g., predictive answers)—while gripping device 500 in a certain way—is also likely to be able to access the other input modality (e.g., virtual keyboard 520) without having to reposition the device. However, as will be understood by one of ordinary skill in the art, the present invention is not limited to placement of the predicted answers modality contiguous with the virtual keyboard 520, and the predicted answers modality can be located anywhere on the screen.

To further provide a seamless user experience across different input modalities, in some embodiments, as the user begins to type using virtual keyboard 520, device 500 switches from providing predictive answers to providing auto-correct recommendations. This aspect is further described via FIG. 5D with reference back to FIG. 5A: When a user begins typing by selecting key 522 (i.e., "y"), device 500 may cease to display predictive answers (e.g., affordances 510, 512, and 514). Instead, device 500 may display auto-correct affordances 524, 526, and 528. In some embodiments, auto-correct affordances 524, 526, and 528 replace predictive answers affordances 510, 512, and 514 (FIG. 5A) in region 508. These auto-correct affordances may represent recommendations based on the user's key presses. As shown, in response to the input "y," device 500 offers "yes," "yep," and "ur" as auto-correct recommendations. The user may select one of the auto-correct affordances to send the corresponding recommendation as a message to the participant(s) of the on-going message conversation. In this way, device 500 permits a user to seamless transition between multiple input modalities while retaining the useful features of each modality.

Figure 5E:
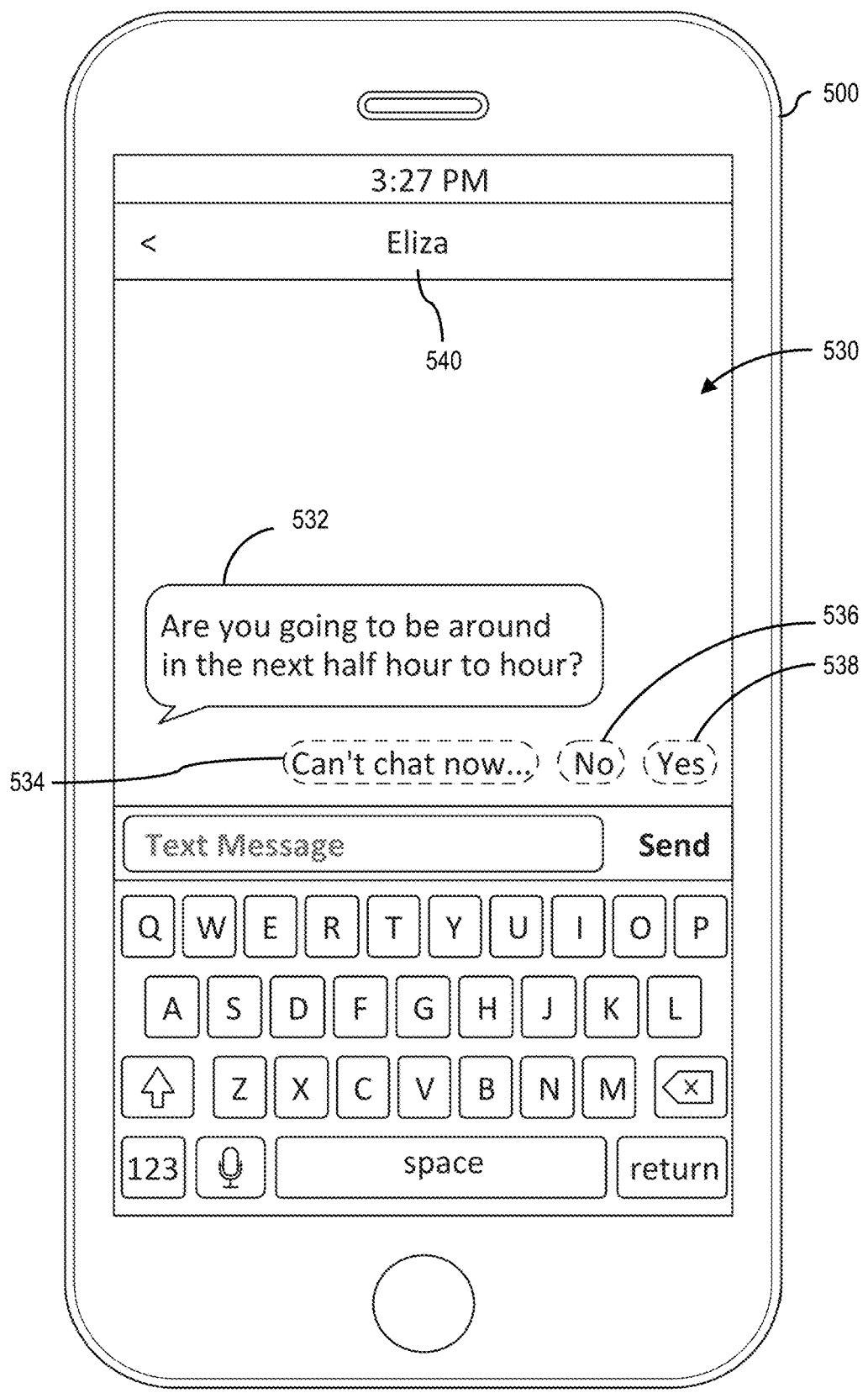
Figure 5F:
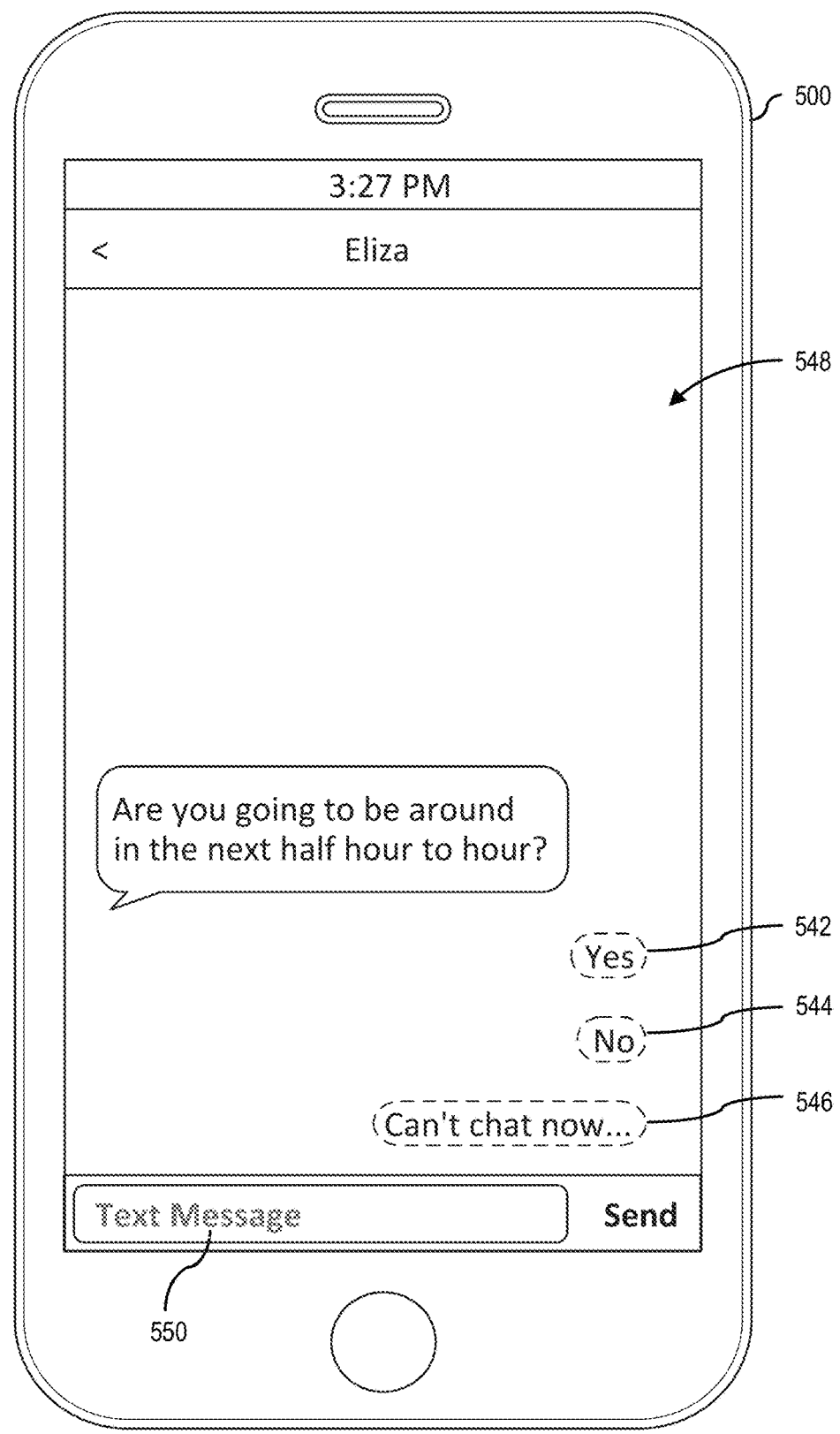
Figure 5G:
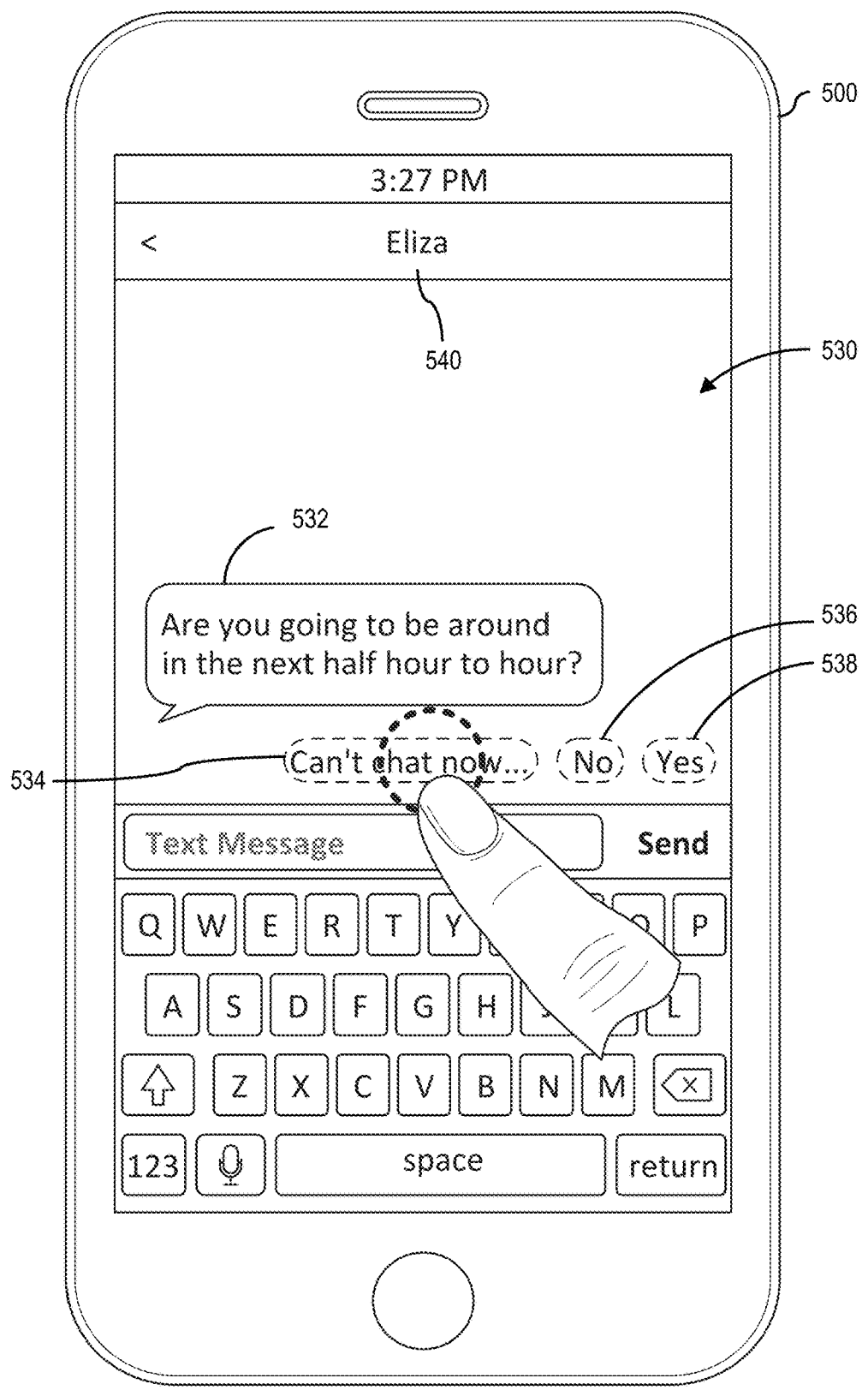

FIGS. 5E-5G demonstrate additional exemplary user interfaces supporting predictive answers in some embodiments. As shown in FIG. 5E, electronic device 500 may display message transcript 530. Message transcript may include message 532 received from participant 540. As discussed above, device 500 is able to determine that message 532 contains an interrogatory, particularly a question about the user's whereabouts in the next half hour to hour. In accordance with this determination, device 500 displays affordances 534, 536, and 538 containing the predictive answers "can't chat now," "no," and "yes," respectively. In the illustrated example, affordances 534, 536, and 538 are displayed horizontally within message transcript 530.

FIG. 5F illustrates an embodiment in which device 500 displays predictive answer affordances in a vertical arrangement within message transcript 548. As shown, predictive answer affordances 542, 544, and 546 are displayed vertically. In addition, as shown, a virtual keyboard (e.g., virtual keyboard 520) is not displayed in order to increase space for the display of message transcript 548. Device 500 may, however, display a virtual keyboard when a touch event or mouse event on message input field 550 is received. In some embodiments, when the virtual keyboard is invoked, device 500 continues to display affordances 542, 544, and 546 vertically. In some embodiments, if a user invokes the display of a virtual keyboard, device 500 transitions to display affordances 542, 544, and 546 horizontally across one or more rows. Put another way, it is possible for device 500 to transition from the user interface illustrated in FIG. 5F to a user interface screen that is similar to user interface screen 530 (FIG. 5E), if and when the user invokes a virtual keyboard.

Figure 5H:
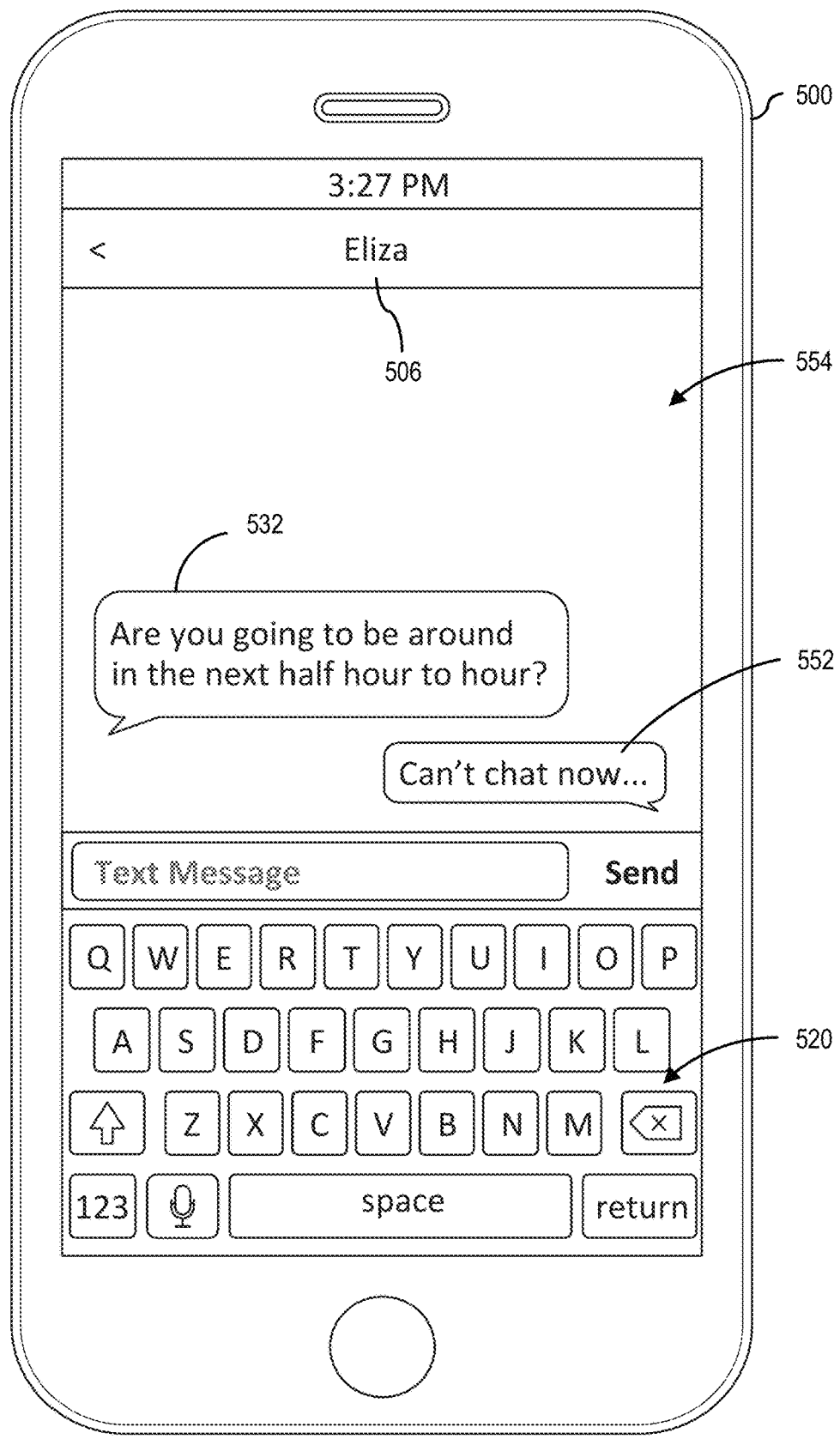

Predictive answer affordances 534, 536, 538, 542, 544, and 546 shown in FIGS. 5E and 5F are available for user selection. When a displayed predictive answer affordance is selected, its corresponding message is inserted into the relevant message transcript, and the message is sent to the participant(s) of the ongoing messaging conversation. FIGS. 5G and 5H illustrate this aspect. As shown in FIG. 5G, device 500 may display predictive answer affordances 534, 536, and 538 in view of incoming message 532. A user may select affordance 534 representing the message "can't chat now." Turning to FIG. 5H, in response to detecting the user selection of affordance 534, device 500 may display the selected predictive answer in message transcript 530. Specifically, the message "can't chat now" is inserted into message bubble 552 in message transcript 554.

Figure 5I:
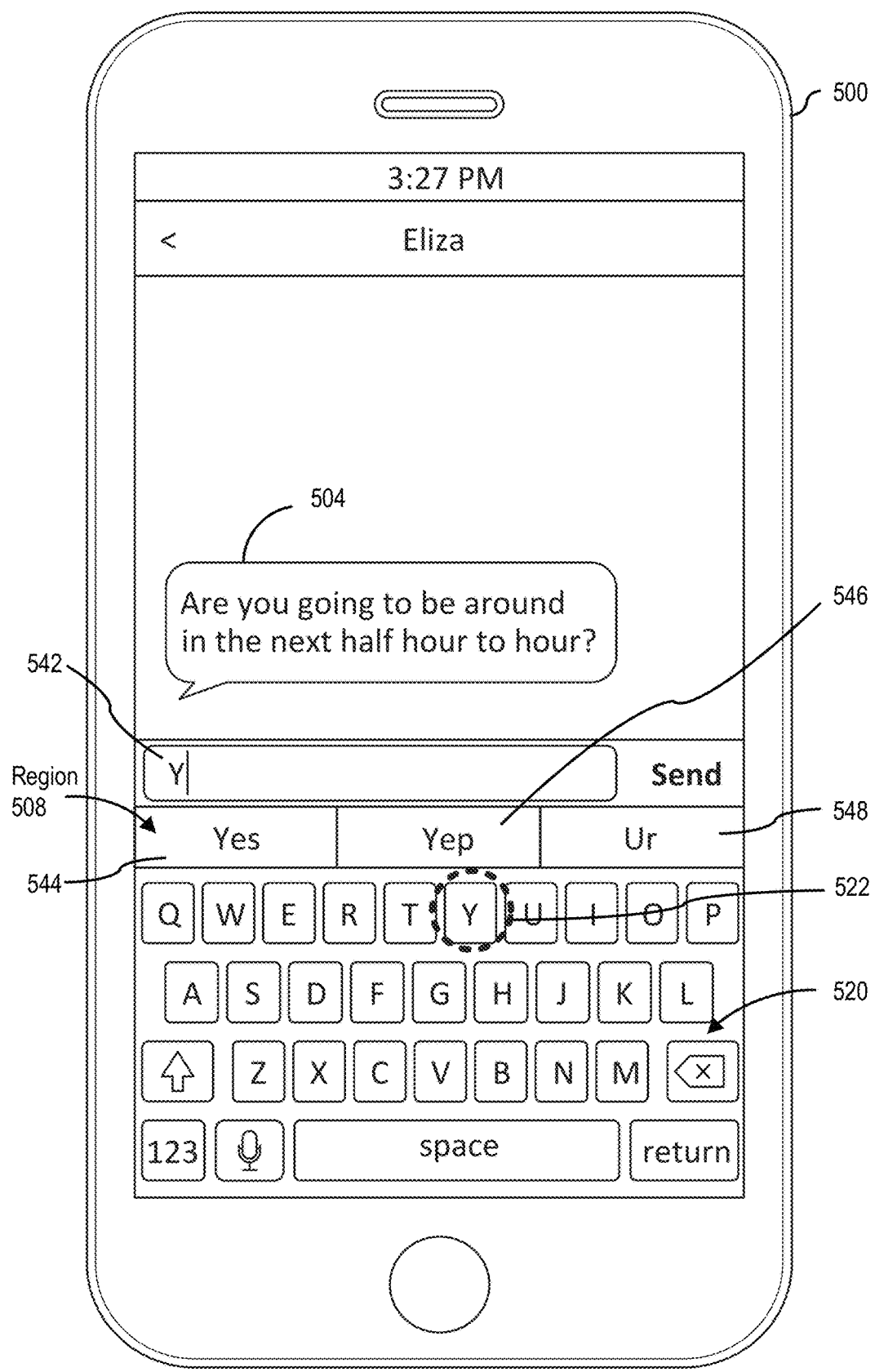

Further, as discussed above, when predictive answer affordances 534, 536, 538, 542, 544, and/or 546 are displayed, a user may still type in a message using a virtual keyboard. FIG. 5I describes this aspect. As shown FIG. 5I, when a user begins to type on virtual keyboard 540, device 500 may cease to display predictive answers. Optionally, the device may display auto-correct recommendations. Comparing FIGS. SI with 5E, when a user selects key 522 (i.e., "y"), affordances 534, 536, and 538 are removed from the display, while auto-correct affordances 524, 526, and 528 become displayed. A user may select one of the auto-correct affordances to insert a corresponding message into the on-going message transcript.

The visual appearance of affordances used to represent predictive answer in different embodiments may vary. Turning back to FIGS. 5E and 5F, in the illustrated embodiments, affordances 534, 536, 538, 542, 544, and 546 are of a rectangular shape with rounded edges. In some embodiments, the affordances may take on the visual appearance of message bubbles. In some embodiments, the affordances may take on the visual appearance of a geometric shape. In some embodiments, the affordances may be contiguous regions that are visually distinct from a background of the message transcript of which it is a part. Also, in the illustrated examples of FIGS. 5E and 5F, affordances 534, 536, 538, 542, 544, and/or 546 have dashed outlines. Dashed outlines may be used to emphasize that—while the displayed affordances are available for user selection—their contents have not yet been made part of the message transcript. In other words, a dashed outline may indicate that a predictive answer is available for selection but has not yet been sent to other participants in the ongoing conversation.

The visual appearance of affordances used to represent predictive answers—once the affordance is selected, may also change. Turning again to FIGS. 5G and 5H, affordance 534 (representing the predictive answer of "can't chat now") has a rectangular shape and dashed edges before user selection. Once selected, the content of affordance 534 is displayed inside a message bubble having a solid outline. One of ordinary skill in the art should appreciate that other graphic conventions for displaying message bubbles may be used. For example, instead of a message bubble having a solid outline, device 500 may display a message bubble filled in a color different from the background of message transcript 554 (FIG. 5H), thereby avoiding the need for any outline to visually distinguish the message bubble. As discussed above, affordance 534 need not be limited to message bubbles, but may be of other shapes, as well.

Figure 5J:
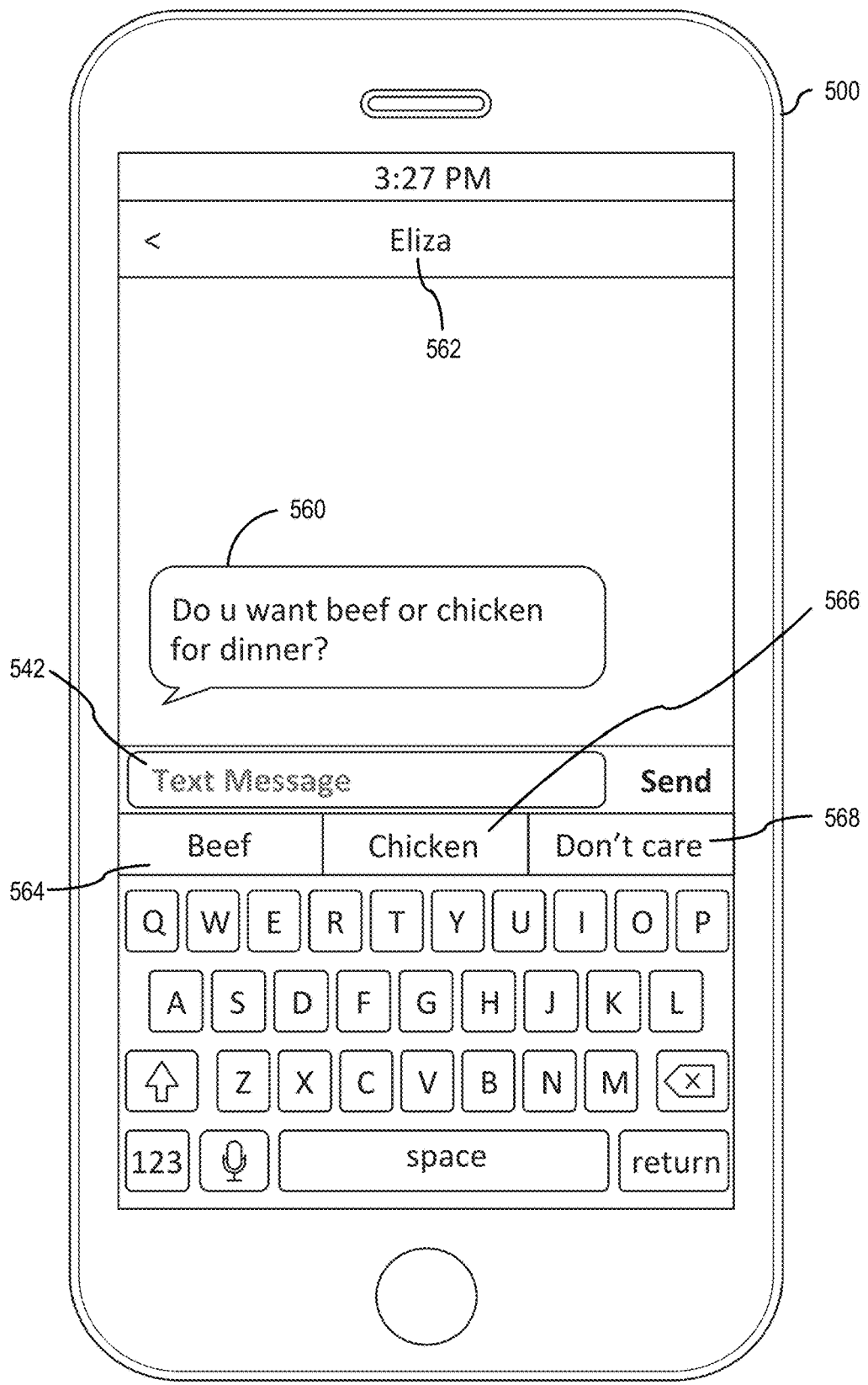

The foregoing examples describe different user interfaces for providing one particular set of predictive answers in response to an exemplary incoming message. The techniques described herein are not limited to just one set of predictive responses. Attention is now directed to other predictive answers can be provided. In FIG. 5J, device 500 is displaying message 560 from participant 562. As shown, message 560 asks question "beef or chicken"? As before, device 500 may determine that message 560 contains an interrogatory (based on at least the use of the question mark in the message). In addition, in parsing message 560, device 500 may recognize the interrogatory is one that contains alternative choices, based on the appearance of the word "or" in the message. In this case, device 500 may parse the words immediately before and after the word "or". As applied to the illustrated example, device 500 may parse the words "beef" and "chicken" because these words appear immediately before and after "or" in message 560. Device 500 may provide the parsed words as predictive answers. As shown in FIG. 5J, device 500 displays predictive answers affordances 564 and 566 corresponding to "beef" and "chicken," respectively. Optionally, when an incoming question is (as is the case here) a question that suggests alternative answers, a device 500 may display other predictive answers, such as "neither," "both," and/or "don't care," as these answers often can be relevant to interrogatories having alternative answers. In the illustrated example, affordance 568 corresponds to the answer of "don't care."

The foregoing examples describe predictive answers that are provided only using text characters. The techniques described herein are not limited to just suggesting text characters. Rather, predictive answers can contain other types of suggested characters, including, e.g., emoji's, affordances (e.g., icons), images, and videos. Conceptually, predictive answers can be any type of information as long as the information can be transmitted as a message. For purposes of this disclosure, the term "one or more characters" encompasses all of the above described types of information (e.g., text, emoji's, affordances (e.g., icons), images, videos).

Figure 6A:
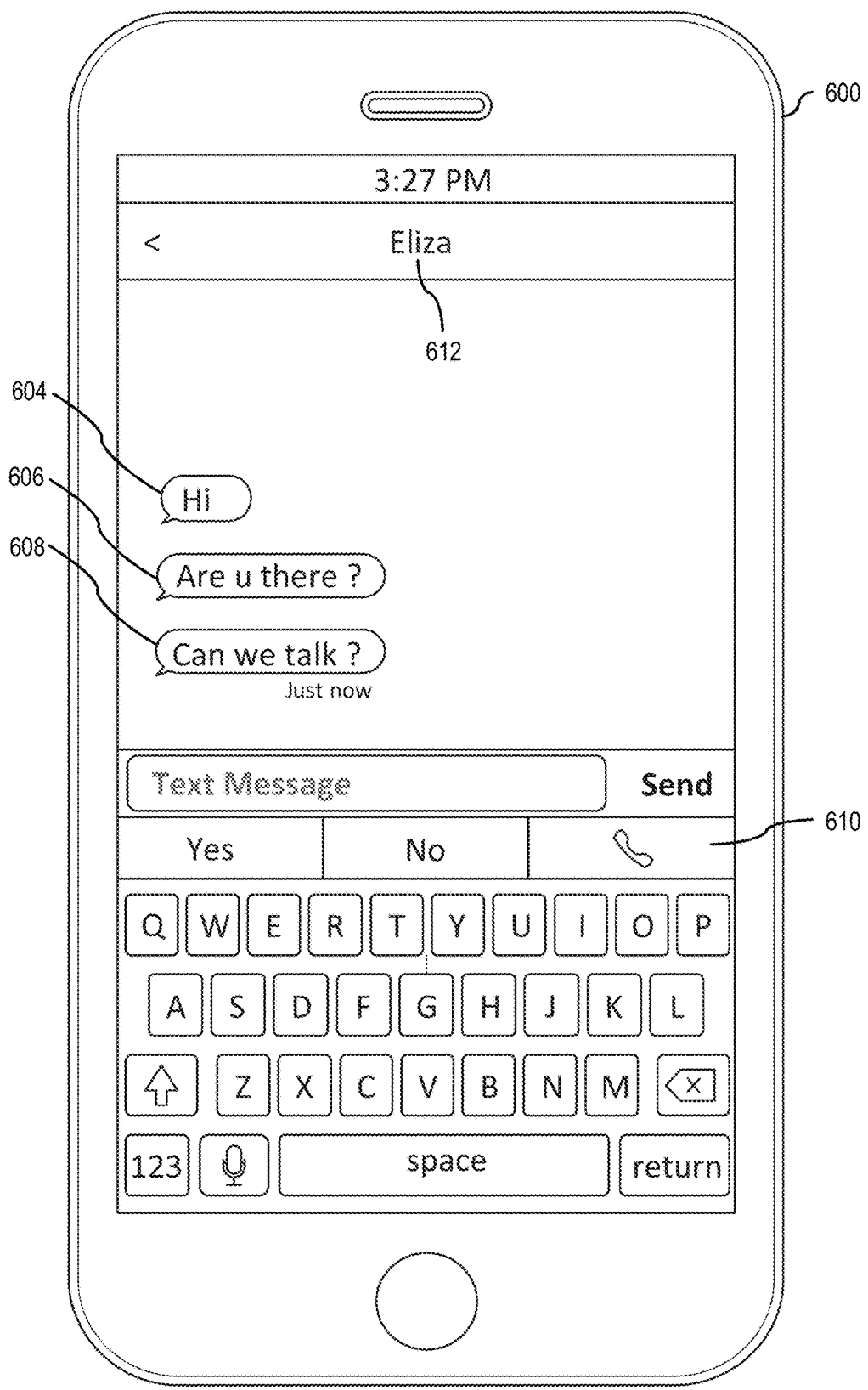
FIGS. 6A-6E illustrate exemplary types of predictive answers.

Attention is now directed to these alternative types of predictive answers, with reference to FIGS. 6A-6E. Turning first to FIG. 6A, device 600 may display message transcript 602 having incoming messages 604, 606, and 608. In view of the content of one or more of incoming messages 604, 606, and 608, device 600 may display predictive answer affordance 610 having a telephone affordance (e.g., icon). If a user selects affordance 610, device 600 may initiate a phone call to participant 612. Device 600 may decide to display affordance 610 in at least one of two ways. In some embodiments, device 600 may recognize that the contents of most-recently-received message 608 ("can we talk") as an invitation from participant 612 for voice communication. In some embodiments, device 600 may recognize that participant 612 has sent a large number of messages in quick succession, and thus voice communication may be an appropriate, proactive response. The large number may be a predetermined threshold set within the software that is running on device 600. In this way, device 600 permits a user to respond to an incoming message by phoning the message's sender.

Although FIG. 6A illustrates an example in which device 600 displays a voice call affordance as a predictive answer, it should be understood that other methods of communication are possible. In some embodiments, device 600 may recognize that the participants to a messaging conversation are using electronic devices that support video calls (e.g., FaceTime® provided by Apple Inc. of Cupertino, Calif.). In this case, device 600 may display an affordance for invoking a video call. In some embodiments, device 600 may additionally consider whether the participants are messaging through specific infrastructures in determining predictive answers. For example, device 600 may display an affordance for invoking a cellular call when the participants are not connected via a wide or local area network, but display an affordance for invoking a Voice-over-IP call otherwise.

Figure 6B:
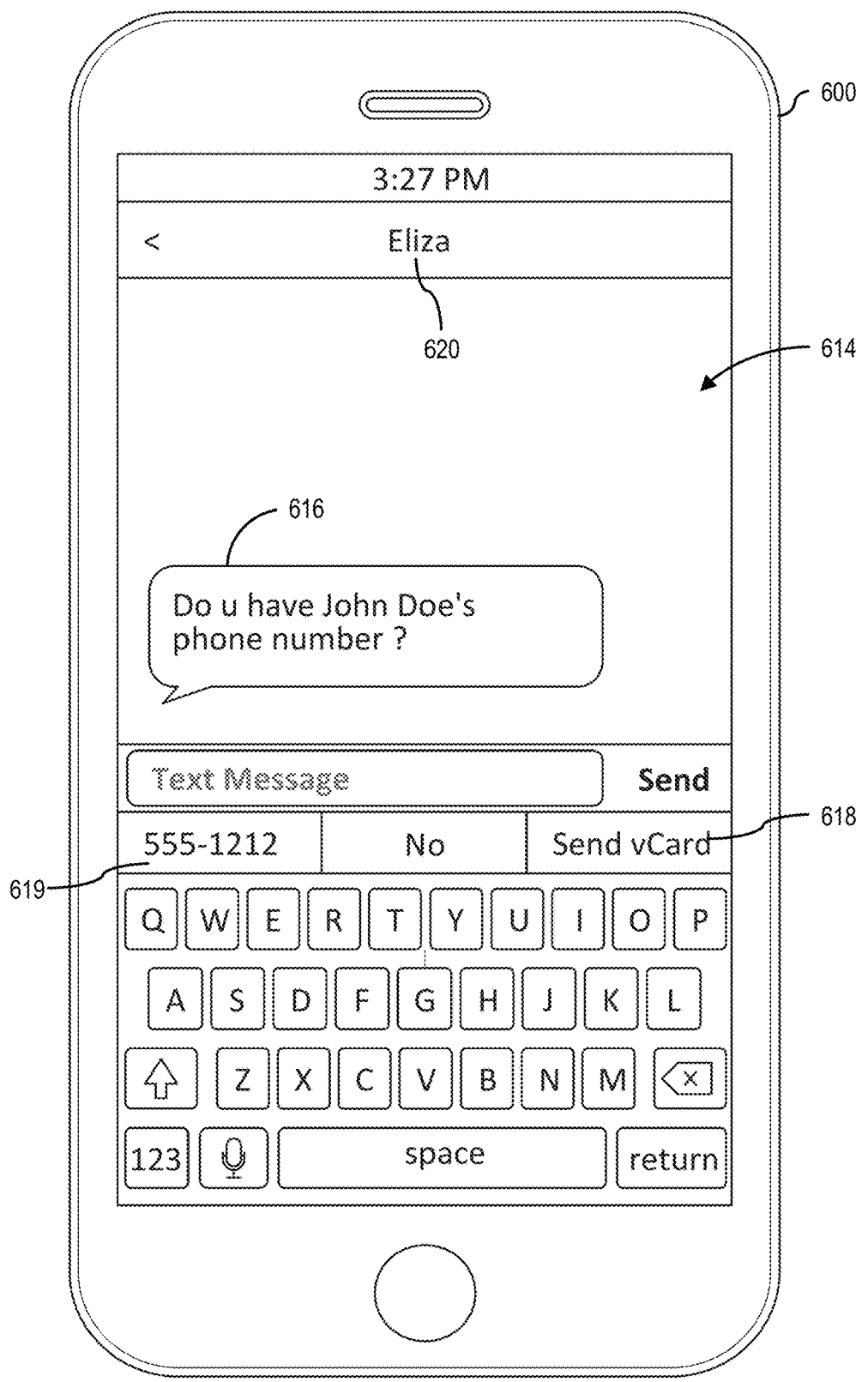

Turning to FIG. 6B, device 600 may display message transcript 614 having incoming message 616. Message 616 contains an inquiry from participant 620 as to John Doe's phone number. In view of this content of message 616, device 600 may determine whether it has access to John Doe's contact information. For example, device 600 may be able to produce an electronic business card for John Doe based on contact information stored on or otherwise accessible (e.g., through the Cloud) to device 600. If device 600 is able to do so, it may display predictive answer affordance 618 for sending John Doe's electronic business card (e.g., vCard) to participant 620. In addition, device 600 may display predictive answer affordance 619 for sending John Doe's phone number to participant 620. If a user selects affordance 618, device 600 may insert a representation of the vCard into message transcript 614 and send the corresponding vCard information to participant 620. If a user selects affordance 619, device 600 may insert the phone number 555-1212 into message transcript 614 and send the number to participant 620. In this way, device 600 permits a user to respond to an incoming message by providing electronic business card information to the message's sender.

Figure 6C:
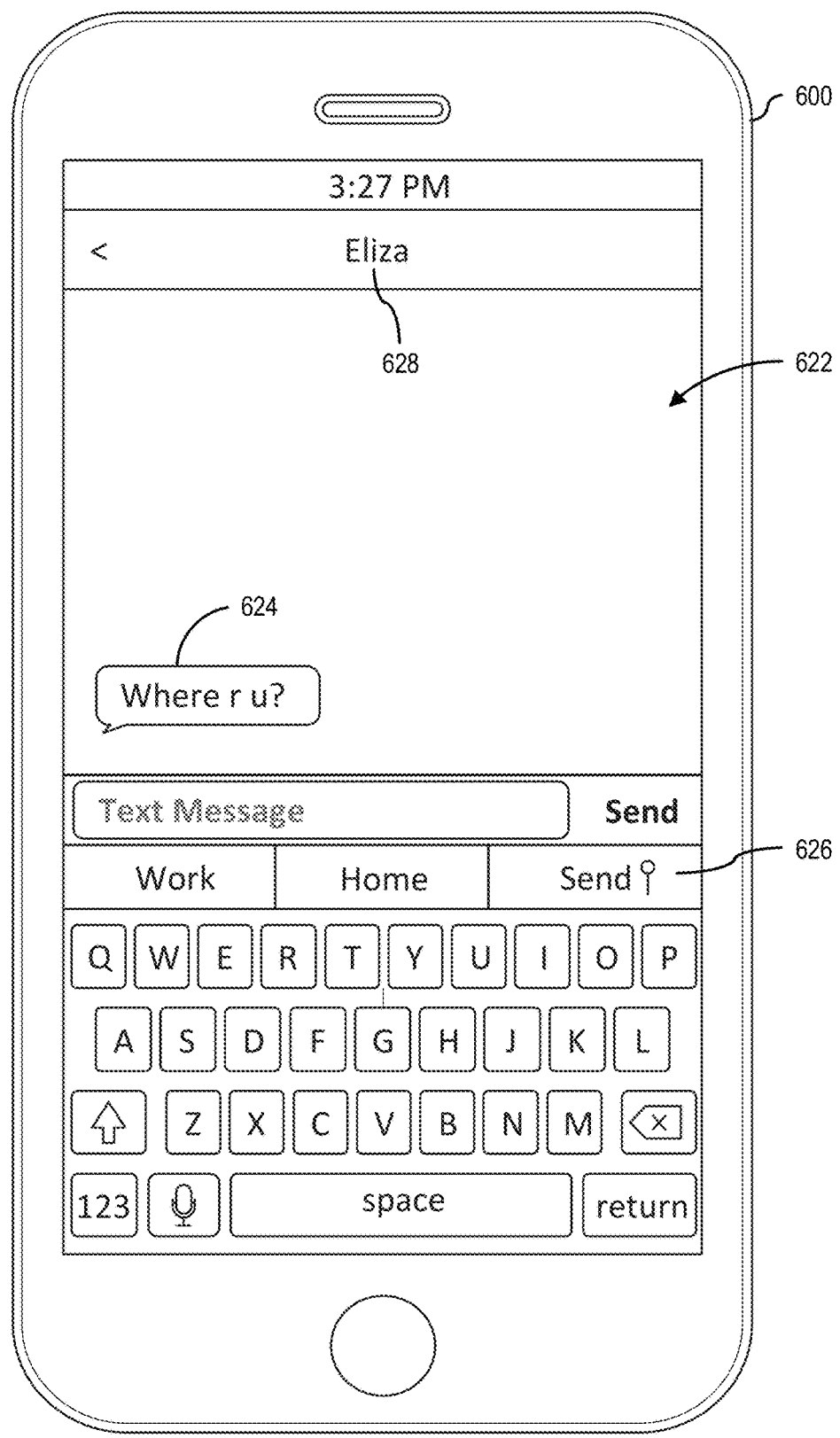

Turning to FIG. 6C, device 600 may display message transcript 622 having incoming message 624. Message 624 may contain an inquiry from participant 628 as to the location of the user of device 600. In view of this content of message 624, device 600 may determine whether it has access to locational information regarding its own whereabouts. For example, device 600 may obtain GPS coordinate information from on-board GPS module 136 (FIG. 1A). If location information is available, device 600 may display predictive answer affordance 626 for sending the user/device's location to participant 628. If a user selects affordance 626, device 600 may insert a representation of the user/device's location (e.g., a map image) into message transcript 622 and send the corresponding location information to the device used by participant 628. In this way, device 600 permits a user to respond to an incoming message by providing locational information to the message's sender.

Figure 6D:
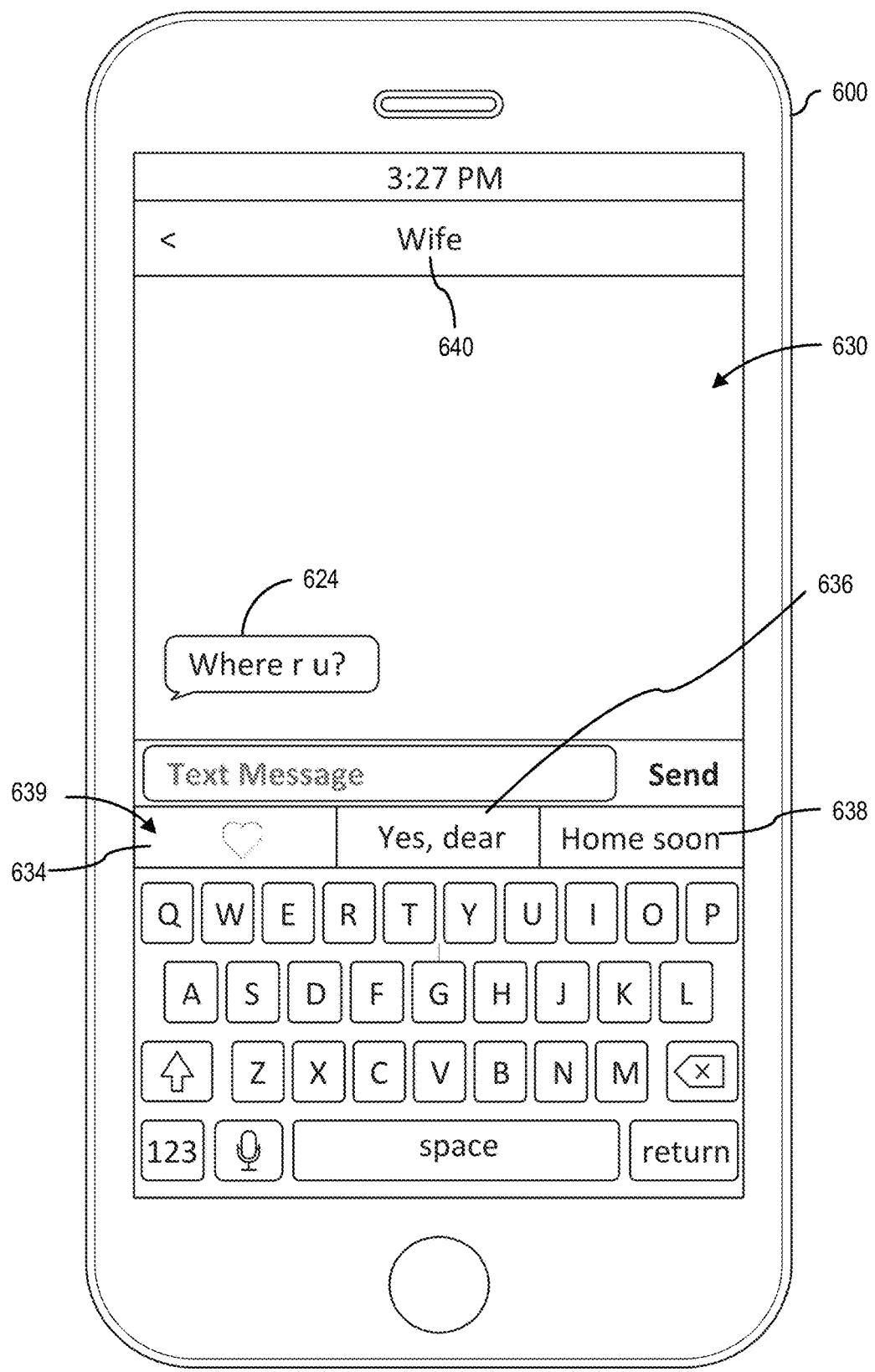

Turning to FIG. 6D, device 600 may display message transcript 630 having incoming message 632. Message 632 may be a message from particular participant-of-interest 640. In some embodiments, participants-of-interest are designated by a user of device 600 (e.g., user favorites). In some embodiments, participants-of-interest are contacts most messaged by the user of device 600. In view of message 632 being sent by participant-of-interest 640, device 600 may display predictive answers that are most likely to be relevant for participant 640. In some embodiments, device 600 considers those answers most-frequently sent to participant 640 as being relevant. In some embodiments, device 600 considers those answers most-recently sent to participant 640 as being relevant. In the illustrated embodiments, device 600 includes emoji icons as possible predictive answers (e.g., affordance 634). If a user selects one of the displayed affordances 634, 636, or 638, device 600 may display the corresponding answer in messages transcript 630 and send the corresponding message to participant-of-interest 640. In some embodiments, device 600 may rank the predictive answers and display the highest ranked answer in a specific on-screen location (e.g., as the center affordance in a horizontal arrangement such as FIG. 5A, or as the top affordance in a vertical arrangement such as FIG. 5F). For example, device 600 may determine that the phrase "yes, dear" is most frequently sent message to participant 640 and therefore display the corresponding affordance 636 as the middle affordance in region 639.

Figure 6E:
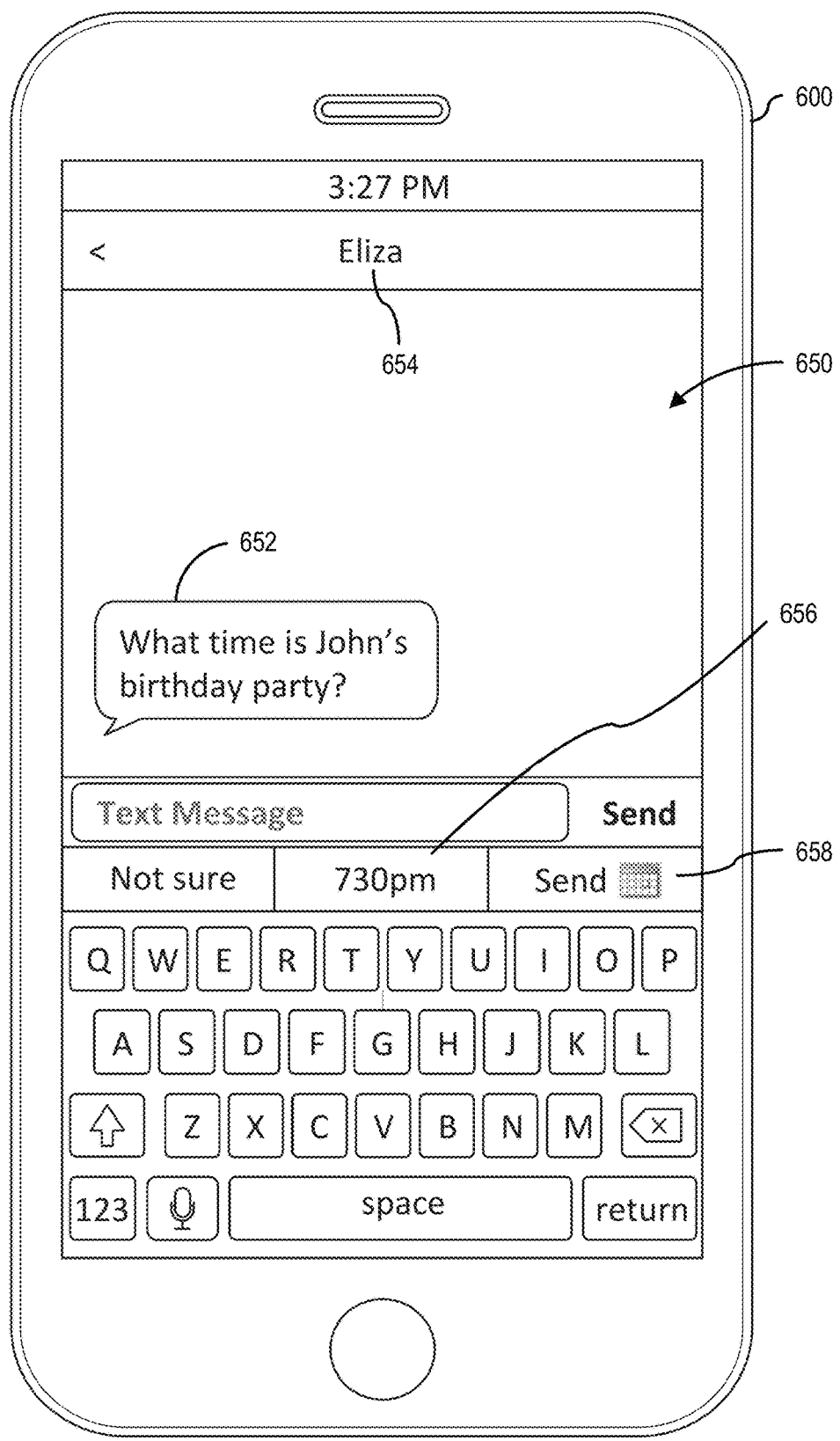

Turning to FIG. 6E, device 600 may display message transcript 650 having incoming message 652. Message 652 may contain an inquiry from participant 654 as to the time of John's birthday party. In view of this content of message 652, device 600 may determine whether it has access to a calendar entry referring to John's birthday party. For example, device 600 may be able to produce a calendar invitation titled "John's Birthday" based on calendar information stored on or otherwise accessible (e.g., through the Cloud) to device 600. If device 600 is able to do so, it may display predictive answer affordance 658 for sending a copy of the calendar event to participant 654. In addition, device 600 may be able to parse the obtained calendar information to determine that the start time of John's party is 730 pm. If device 600 is able to do so, it may display predictive answer affordance 656 for sending the start time as text to participant 654. If a user selects affordance 656 or 658, the corresponding information ("730 pm" and a calendar event, respectively) may be sent to participant 654. Device 600 may also insert a representation of the sent information into message transcript 650.

Exemplary Processes

FIG. 7 is a flow diagram illustrating process 700 for providing predictive answers. Process 700 may be performed at an electronic device with a display and a touch-sensitive surface, like device 100 (FIG. 1) and device 300 (FIG. 3). At block 702, the device displays a message transcript, the message transcript including at least one message from at least a first user. At block 704, the device determines, based at least in-part on the at least one message, a plurality of suggested one or more characters. These suggested one or more characters may be drawn from the examples of predictive answers discussed above with reference to FIGS. 5A-5J and 6A-6D, for example. At block 706, the device displays, on its touch-sensitive display, the plurality of suggested one or more characters. The display may be drawn from the examples of user interface layouts described above with reference to FIGS. 5A, 5E, and 5F, for example. At block 708, the device detects an input on the touch-sensitive display. At block 710, the device determines whether the input represents user selection of one of the plurality of suggested one or more characters. At block 710, the device, in accordance with a determination that the input represents user selection of one of the plurality of suggested one or more characters, displays the selected one of the plurality of suggested one or more characters in the message transcript.

FIG. 8 is a flow diagram illustrating process 800 for providing predictive answers. Process 800 may be performed at an electronic device with a display and a touch-sensitive surface, like device 100 (FIG. 1) and device 300 (FIG. 3). At block 802, the device displays, in a first region of the display, a message transcript, the message transcript including at least one message from at least a first user. At block 804, the device displays, in a second region of the display, a virtual keyboard, the virtual keyboard including a number of character keys. At block 806, the device displays, in a third region of the display, a plurality of suggested one or more characters, the plurality of suggested characters determined based, at least in-part, on a content of the at least one message received from the first user. In some embodiments, the third region is displayed contiguous with one of the first and second regions. In some embodiments, the third region is displayed contiguous with the first and second regions. At block 808, optionally, the device detects input representing user selection of a suggested one or more characters from the displayed plurality of one or more characters. At block 810, optionally, in response to in response to detecting the input, the device displays the selected suggested one or more characters into the message transcript in the first area.

Figure 9:
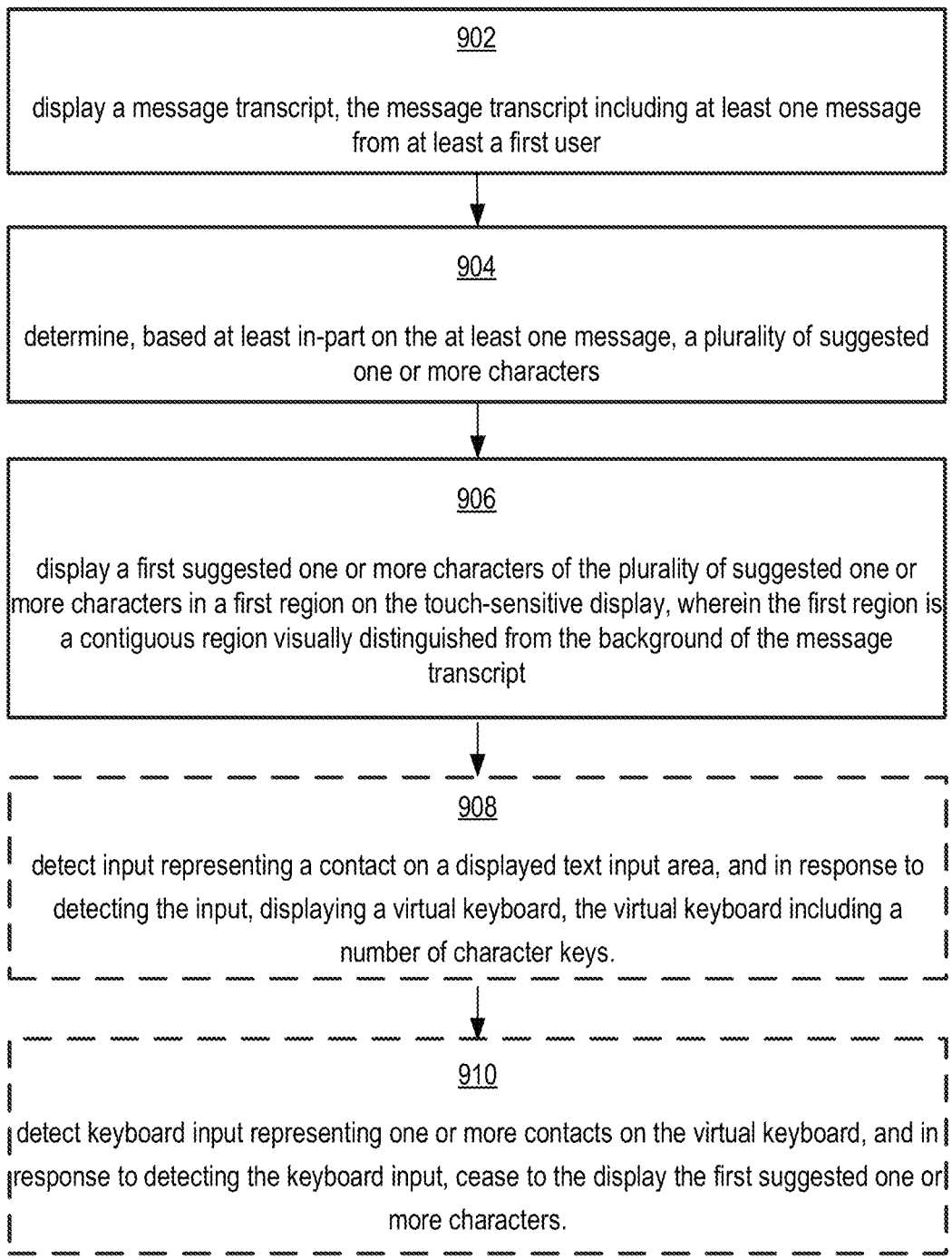
FIG. 9 is a flow diagram illustrating a process for transitioning between electronic devices.

FIG. 9 is a flow diagram illustrating process 900 for providing predictive answers. Process 900 may be performed at an electronic device with a display and a touch-sensitive surface, like device 100 (FIG. 1) and device 300 (FIG. 3). At block 902, the device displays a message transcript, the message transcript including at least one message from at least a first user. At block 904, the device determines, based at least in-part on the at least one message, a plurality of suggested one or more characters. At block 906, the device displays a first suggested one or more characters of the plurality of suggested one or more characters in a first region on the touch-sensitive display. The region may be a contiguous region visually distinguished from the background of the message transcript. At block 908, optionally, the device detects input representing a contact on a displayed text input area, and in response to detecting the input, displays a virtual keyboard. The displayed virtual keyboard may include a number of character keys. At block 910, optionally, the device detects keyboard input representing one or more contacts on the virtual keyboard, and in response to detecting the keyboard input, the device ceases to the display the first suggested one or more characters.

Figure 10:
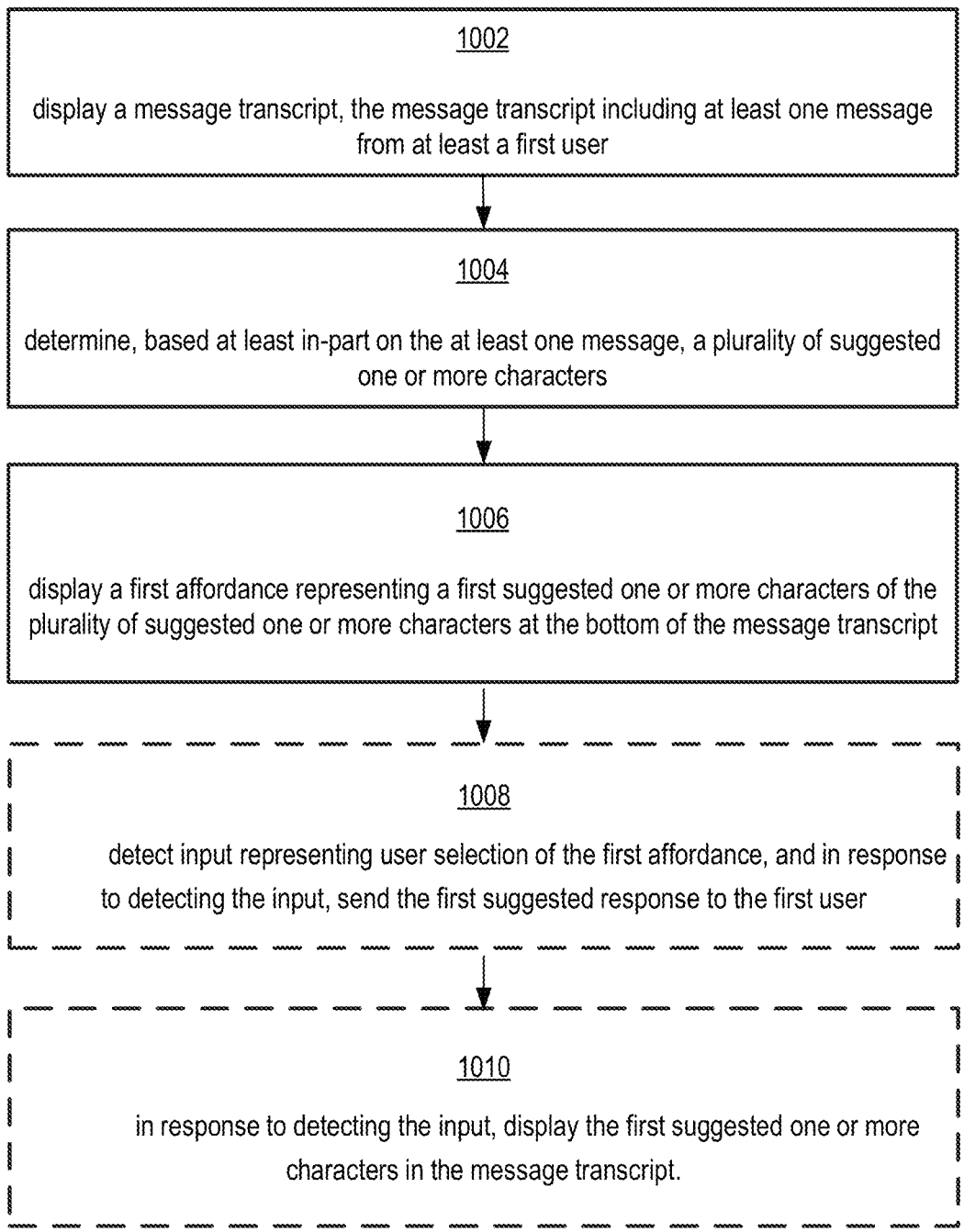
FIG. 10 is a flow diagram illustrating a process for transitioning between electronic devices.

FIG. 10 is a flow diagram illustrating process 1000 for providing predictive answers. Process 1000 may be performed at an electronic device with a display and a touch-sensitive surface, like device 100 (FIG. 1) and device 300 (FIG. 3). At block 1002, the device displays a message transcript, the message transcript including at least one message from at least a first user. At block 1004, the device determines, based at least in-part on the at least one message, a plurality of suggested one or more characters. At block 1006, the device displays a first affordance representing a first suggested one or more characters of the plurality of suggested one or more characters at the bottom of the message transcript. At block 1008, optionally, the device detects input representing user selection of the first affordance, and in response to detecting the input, sends the first suggested response to the first user. At block 1010, optionally, in response to detecting the input, the device displays the first suggested one or more characters in the message transcript.

It should be understood that the particular order in which the operations in FIGS. 7-10 have been described is merely exemplary and is not intended to indicate that the described order is the only order in which the operations could be performed. One of ordinary skill in the art would recognize various ways to reorder the operations described herein. Additionally, it should be noted that processes 700-1000 may additionally incorporate the functionalities described about with respect to FIGS. 5A-5J to produce new processes and user interfaces. For example, the switching of displays of predictive answers and auto-correct recommendations, described with respect to FIGS. 5A and 5D, for example, may be incorporated into processes 700-1000 (FIGS. 7-10.) Likewise, the sending of business card information and calendar information described with respect to FIGS. 6A-6E are may also be incorporated into processes 700-1000 (FIGS. 7-10.) Further, the displaying of a telephone affordances can be implemented across each of the user interfaces descried in FIGS. 5A, 5E, and 5F. For brevity, these details are not repeated here.

One common aspect of the above-described techniques is that a device needs to process an incoming message(s) to identify predictive answers for the message. In some embodiments, this processing entails two steps: first, the device parse an incoming message and assigns a message class to the content of a message; second, the device performs a lookup for corresponding predictive answers based on the message class, and composes an appropriate set of predictive answers based on the content of the incoming message.

The first step of assigning a message to a message class may be performed using a rule-based engine. In some embodiments, the rule based engine may assign a message class based (at least in-part) on the occurrence of one or more words in the message. As discussed above, examples of such words include "are you" and "or." In some embodiments, the rule based engine may assign a message class based (at least in-part) on the occurrence of a punctuation mark used in the message. As discussed above, examples of such punctuations include the use of a question mark. In some embodiments, the rule based engine may assign a message class based (at least in-part) on the use of an honorific in the message. Examples of such honorifics include the use of suffixes such as "-san" in a message. More generally speaking, in some embodiments, a rule based engine that identifies relevant language markers such as auxiliaries and interrogative pronouns may be used to determine message classes. In some embodiments, a rule based engine that identifies syntactic constructs such as verb-predicate inversions may be used. Table 1, below, lists exemplary classes of messages.

TABLE 1

| Message Class | Example [Comment] |
| --- | --- |
| GenericStatement | The sky is blue. [requires no answer] |
| GenericQuestion | Who?/What?/Where? [requires precise answer] |
| StatementOrQuestion | I'm ready. [may require acknowledgment] |
| QueryPolar | Will you come? |
| QueryPolarDefinite | Have you left yet? |
| QueryPolarRequest | Can you drive? |
| QueryAlternative | Shall we walk or drive? |
| QueryEvaluation | How was it? |
| QueryReason | Why?/How come? |
| QueryLocationSelf | Where are you? |
| QueryDistance | How close?/How far? |
| QueryCountable | How many cups? |
| QueryUncountable | How much sugar? |

TABLE 1-continued

| Message Class | Example [Comment] |
| --- | --- |
| QueryTime | When?/What time? |
| QueryTimePast | When did you arrive? |
| QueryTimeFuture | When will you leave? |
| QueryTimeOfDay | What time tomorrow? |
| QueryDay | What day? |
| QueryMonth | What month? |
| QueryYear | What year? |
| QueryDuration | How long? |
| StatementGreeting | Hello. |
| StatementImperative | Let's go. |
| StatementAppreciation | Thank you. |

Once a message class has been identified, the device may lookup possible predictive answers for the particular class. Table 2, below, lists exemplary mapping of predictive answers to message classes.

TABLE 2

| Message Class | Response Set |
| --- | --- |
| GenericStatement | Ok/Thanks |
| GenericQuestion | Not sure |
| StatementOrQuestion | Ok/Yes/No |
| QueryPolar | Yes/No/I don't know |
| QueryPolarDefinite | Yes/No |
| QueryPolarRequest | Sure thing/Sorry, no |
| QueryAlternative | Predicate before or/Predicate after or |
| QueryEvaluation | Good/Bad/Ok |
| QueryReason | Just because/I don't know |
| QueryLocationSelf | On my way/In my car/At work/At home |
| QueryDistance | Close/Far |
| QueryCountable | One/Two/A few/A lot |
| QueryUncountable | A little/A lot |
| QueryTime | Early/Late |
| QueryTimePast | Yesterday/Earlier this week/A while ago |
| QueryTimeFuture | Tomorrow/Later this week/In the near future |
| QueryTimeOfDay | Morning/Afternoon/Evening |
| QueryDay | Today/Tomorrow/Yesterday |
| QueryMonth | Thist month/Next month/Last month |
| QueryYear | This year/Next year/Last year |
| QueryDuration | 15 mins/30 mins/An hour |
| StatementGreeting | Hi/Hello |
| StatementImperative | Ok/Sorry, can't |
| StatementAppreciation | You're welcome/No problem/Ok |

Figure 11:
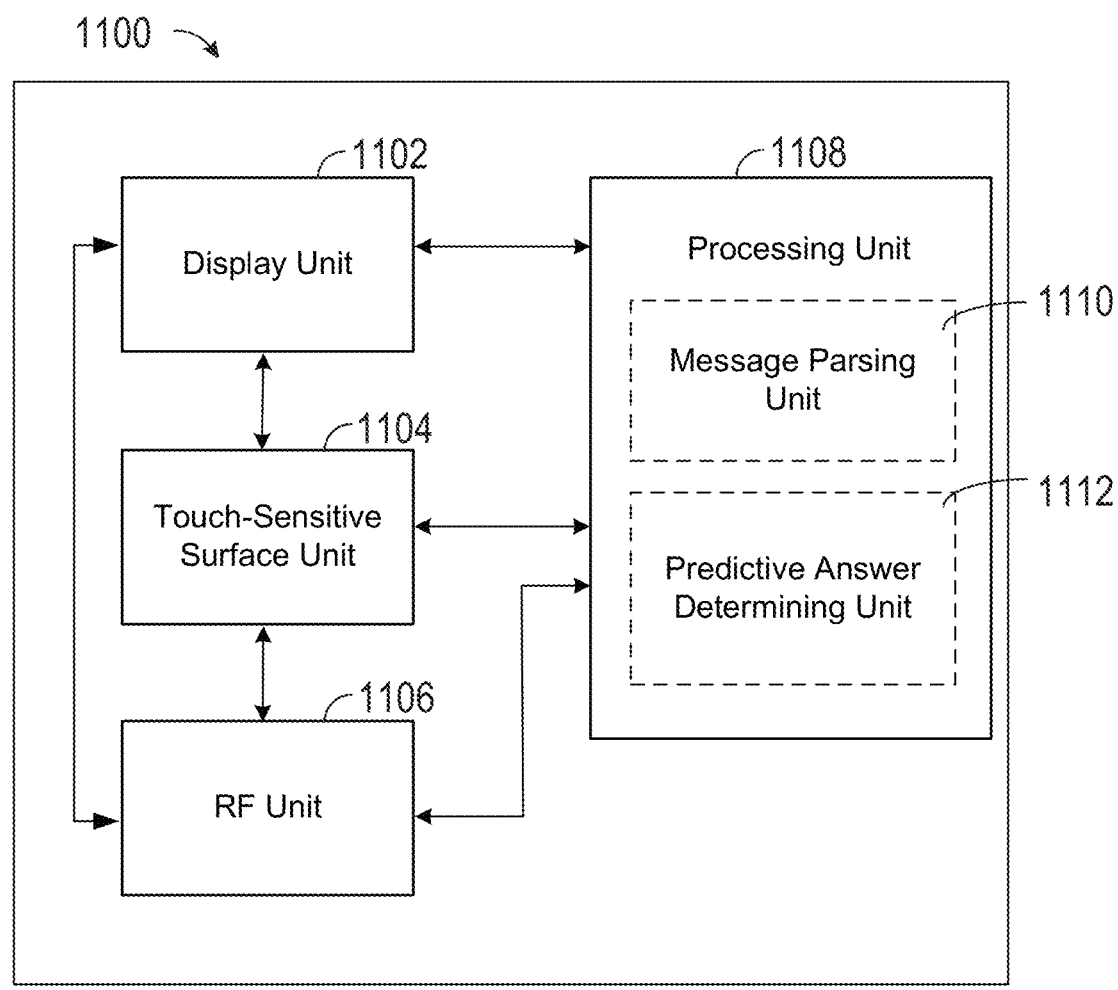
FIGS. 11-15 are functional block diagram of electronic devices in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display various graphical object including messages and predictive answers information; a touch-sensitive surface unit 1104 configured to receive user input; a RF unit 1106 configured to communicate with other electronic devices; and a processing unit 1108 coupled to the afore-mentioned units. In some embodiments, processing unit 1108 includes a message parsing unit 1110 that reads an incoming message to identify, for example, the class of an incoming message. Processing unit 1108 may also include predictive answer determining 1112 configured to provide predictive answers based on the results of the parsing unit.

Figure 12:
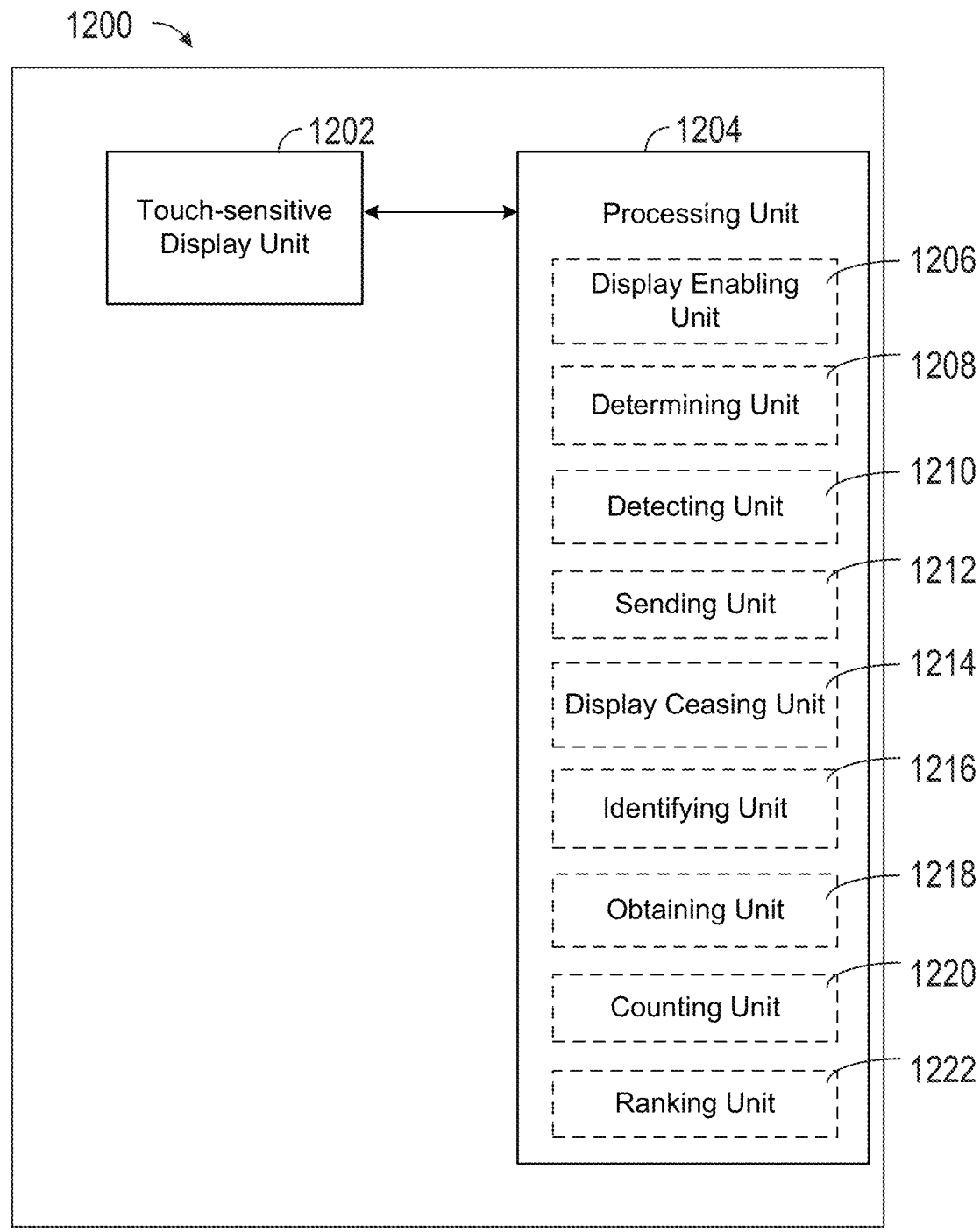

In accordance with some embodiments, FIG. 12 shows an exemplary functional block diagram of an electronic device 1200 configured in accordance with the principles of the various described embodiments. In accordance with some embodiments, the functional blocks of electronic device 1200 are configured to perform the techniques described above. The functional blocks of the device 1200 are, optionally, implemented by hardware, software, or a combination of hardware and software to carry out the principles of the various described examples. It is understood by persons of skill in the art that the functional blocks described in FIG. 12 are, optionally, combined or separated into sub-blocks to implement the principles of the various described examples. Therefore, the description herein optionally supports any possible combination or separation or further definition of the functional blocks described herein.

As shown in FIG. 12, an electronic device 1200 includes a touch-sensitive display unit 1202 configured to display a graphic user interface and to receive contacts, and a processing unit 1204 coupled to the touch-sensitive display unit 1202. In some embodiments, the processing unit 1204 includes display enabling unit 1206, determining unit 1208, detecting unit 1210, sending unit 1212, display ceasing unit 1214, identifying unit 1216, obtaining unit 1218, counting unit 1220, and ranking unit 1222.

The processing unit 1204 is configured to: enable display (e.g., using display enabling unit 1206) of a message transcript, the message transcript including at least one message from at least a first user. The processing unit 1204 is further configured to determine (e.g., using determining unit 1208), based at least in-part on the at least one message, a plurality of suggested one or more characters. The processing unit 1204 is further configured to enable display (e.g., using display enabling unit 1206), on the touch-sensitive display unit 1202, of the plurality of suggested one or more characters. The processing unit 1204 is further configured to detect (e.g., using detecting unit 1210) an input on the touch-sensitive display unit. The processing unit 1204 is further configured to determine (e.g., using determining unit 1208) whether the input represents user selection of one of the plurality of suggested one or more characters. The processing unit 1204 is further configured to, in accordance with a determination that the input represents user selection of one of the plurality of suggested one or more characters, enable display (e.g., using disable enabling unit 1206) of the selected one of the plurality of suggested one or more characters in the message transcript.

In some embodiments, the processing unit 1204 is further configured to: detect (e.g., using detecting unit 1210) a second input on the touch-sensitive display unit, the second input representing user selection of a confirmation affordance, and in response to detecting the second input, send (e.g., using sending unit 1212) the selected one or more characters to the first user.

In some embodiments, enable display (e.g., using display enabling unit 1206) of a virtual keyboard, the virtual keyboard including a number of character keys; detect (e.g., using detecting unit 1210) keyboard input representing one or more contacts on the virtual keyboard; and, in response to detecting the keyboard input: cease to display (e.g., using display ceasing unit 1214) the plurality of suggested one or more characters; and enable display (e.g., using display enabling unit 1206) of, in the third region, auto-correct information based on the keyboard input.

In some embodiments, the processing unit 1204 is further configured to: determine (e.g., using determining unit 1208) the plurality of suggested one or more characters based on at least one word used in the at least one message.

In some embodiments, the processing unit 1204 is further configured to: identify (e.g., using identifying unit 1216) a use of the word "or" in the at least one message; identify (e.g., using identifying unit 1216) a preceding word that appears immediately before the word "or"; and identify (e.g., using identifying unit 1216) a subsequent word that appears immediately after the word "or", wherein: enabling display of the plurality of suggested one or more characters comprises enabling display of at least the preceding word and the subsequent word.

In some embodiments, the processing unit 1204 is further configured to: determine (e.g., using determining unit 1208) the plurality of suggested one or more characters based on a punctuation mark used in the at least one message.

In some embodiments, the processing unit 1204 is further configured to: determine (e.g., using determining unit 1208) whether the at least one message contains an interrogatory sentence; and, in accordance with a determination that the at least one message contains an interrogatory sentence, enable display (e.g., using display enabling unit 1206) of at least "yes" and "no" as part of the plurality of suggested one or more characters.

In some embodiments, the processing unit 1204 is further configured to: determine (e.g., using determining unit 1208) the plurality of suggested one or more characters based on at least the identity of the first user.

In some embodiments, the processing unit 1204 is further configured to: identify (e.g., using identifying unit 1216) the most-frequently-sent messages to the first user, wherein: enabling display (e.g., using display enabling unit 1206) of the plurality of suggested one or more characters comprises enabling display the most-frequently-sent messages.

In some embodiments, the processing unit 1204 is further configured to: identify (e.g., using identifying unit 1216) the most-recently-sent messages to the first user, and wherein enabling display of (e.g., using display enabling unit 1206) of the plurality of suggested one or more characters comprises enabling display of at least one of the most-recently-sent messages.

In some embodiments, the processing unit 1204 is further configured to: determine (e.g., using determining unit 1208) the plurality of suggested one or more characters based on at least a location of the first user.

In some embodiments, the processing unit 1204 is further configured to: determine (e.g., using determining unit 1208) a location of the electronic device, and enable display (e.g., using display enabling unit 1206) of an affordance for sending the location as a message to the first user.

In some embodiments, the processing unit 1204 is further configured to: determine (e.g., using determining unit 1208) the plurality of suggested one or more characters based on at least one calendar entry stored in the electronic device.

In some embodiments, the processing unit 1204 is further configured to: obtain (e.g., using obtaining unit 1218) a calendar entry based on the message received from the first user; and enable display (e.g., using display enabling unit 1206) of an affordance for sending at least a portion of the obtained calendar entry as a message to the first user.

In some embodiments, the processing unit 1204 is further configured to: determine (e.g., using determining unit 1208) the plurality of suggested one or more characters based on at least an honorific used in the at least one message.

In some embodiments, the processing unit 1204 is further configured to: obtain (e.g., using obtaining unit 1218) a plurality of contact names stored on the electronic device; detect (e.g., using detecting unit 1210) the use of a contact name of the plurality of contact names in the at least one message; obtain (e.g., using obtaining unit 1218) contact information corresponding to the used contact name; and enable display (e.g., using display enabling unit 1206) of an affordance for sending at least a portion of the obtained contact information as a message to the second user.

In some embodiments, the processing unit 1204 is further configured to: enable display (e.g., using display enabling unit 1206) of an affordance for calling a phone number associated with the obtained contact information.

In some embodiments, the processing unit 1204 is further configured to: count (e.g., using counting unit 1220) the number of messages received from the first user within a time interval; and, in accordance with a determination that the number exceeds a predetermined threshold, enable display (e.g., using display enabling unit 1206) of an affordance for calling the first user.

In some embodiments, the processing unit 1204 is further configured to: count (e.g., using counting unit 1220) the number of messages received from the first user within a time interval; and in accordance with a determination that the number exceeds a predetermined threshold, enable display (e.g., using display enabling unit 1206) of an affordance for video conferencing the first user.

In some embodiments, the processing unit 1204 is further configured to: rank (e.g., using ranking unit 1222) the suggested one or more characters; and enable display (e.g., using display enabling unit 1206) of the top-ranked characters in the center most position among the displayed suggested one or more characters.

In some embodiments, the plurality of suggested one or more characters comprises a first word or phrase, a second word or phrase, and a third word or phrase. In some embodiments, the plurality of suggested one or more characters consists of a first word or phrase, a second word or phrase, and a third word or phrase. In some embodiments, the plurality of suggested one or more characters comprises at least one emoji. In some embodiments, the at least one message is the most-recently-received message from the first user.

The operations described above with reference to FIG. 7 are, optionally, implemented by components depicted in FIGS. 1A-1B or FIG. 12. For example, displaying operation 702, determining operation 704, and detecting operation 708 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 13:
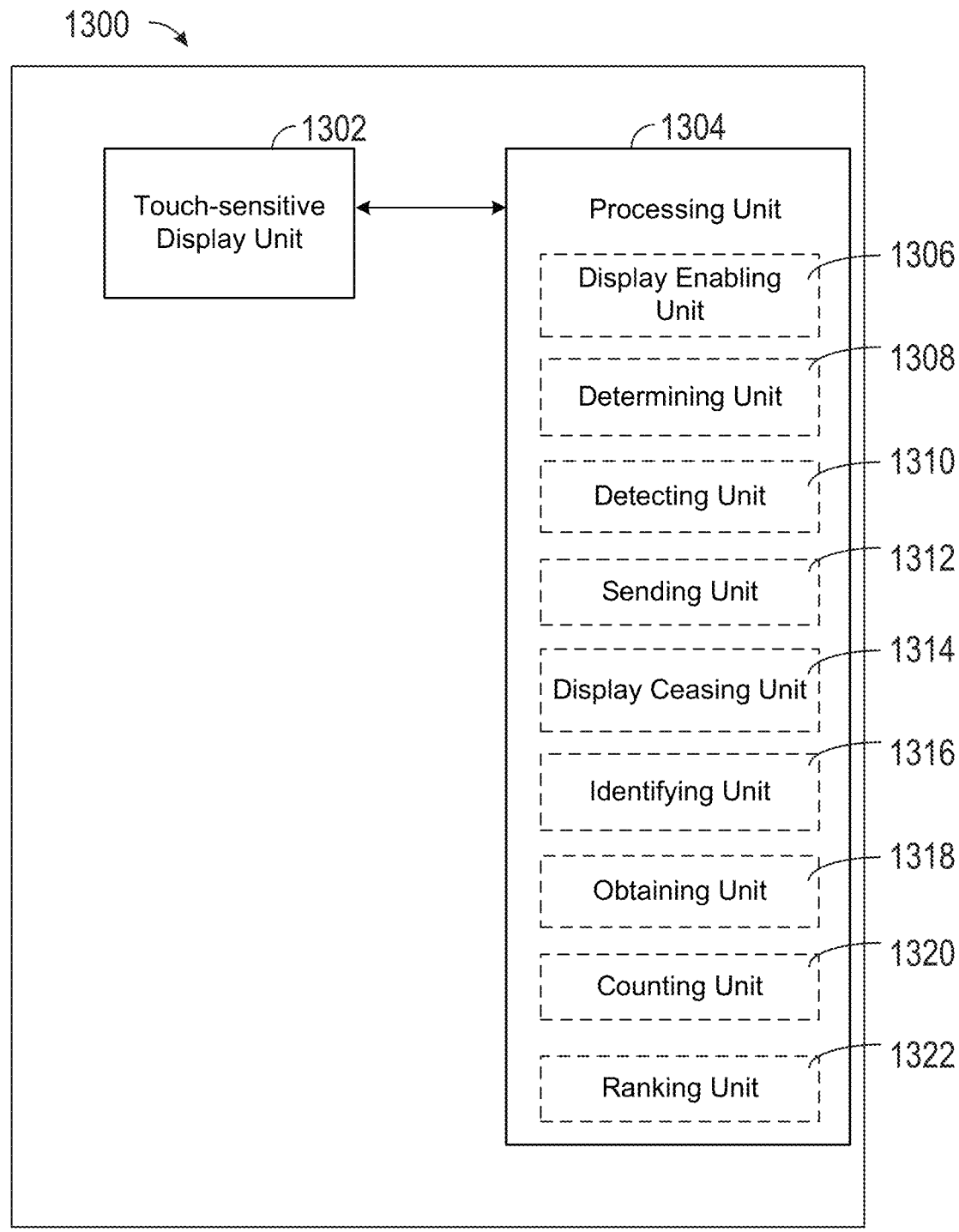

In accordance with some embodiments, FIG. 13 shows an exemplary functional block diagram of an electronic device 1300 configured in accordance with the principles of the various described embodiments. In accordance with some embodiments, the functional blocks of electronic device 1300 are configured to perform the techniques described above. The functional blocks of the device 1300 are, optionally, implemented by hardware, software, or a combination of hardware and software to carry out the principles of the various described examples. It is understood by persons of skill in the art that the functional blocks described in FIG. 13 are, optionally, combined or separated into sub-blocks to implement the principles of the various described examples. Therefore, the description herein optionally supports any possible combination or separation or further definition of the functional blocks described herein.

As shown in FIG. 13, an electronic device 1300 includes a touch-sensitive display unit 1302 configured to display objects and to receive contacts and a processing unit 1304 coupled to the touch-sensitive display unit 1302. In some embodiments, the processing unit 1304 includes display enabling unit 1306, determining unit 1308, detecting unit 1310, sending unit 1312, display ceasing unit 1314, identifying unit 1316, obtaining unit 1318, counting unit 1320, and ranking unit 1322.

The processing unit 1304 is configured to: enable (e.g., using display enabling unit 1306) display of, in a first region of the display, a message transcript, the message transcript including at least one message from at least a first user; enable (e.g., using display enabling unit 1306) display of, in a second region of the display, a virtual keyboard, the virtual keyboard including a number of character keys; and enable (e.g., using display enabling unit 1306) display of, in a third region of the display, a plurality of suggested one or more characters, the plurality of suggested characters determined based, at least in-part, on a content of the at least one message received from the first user.

In some embodiments, the processing unit 1304 is further configured to: enable (e.g., using display enabling unit 1306) display of the third region contiguous with at least one of the first and second regions.

In some embodiments, the processing unit 1304 is further configured to: enable (e.g., using display enabling unit 1306) display of the third region contiguous with the first region and the second region.

In some embodiments, the processing unit 1304 is further configured to: detect (e.g., using detecting unit 1310) input representing user selection of a suggested one or more characters from the displayed plurality of one or more characters; and in response to detecting the input, enable (e.g., using display enabling unit 1306) display of the selected suggested one or more characters into the message transcript in the first area.

In some embodiments, the processing unit 1304 is further configured to: detect (e.g., using detecting unit 1310) second input representing user selection of a confirmation affordance; and in response to detecting the second input, send (e.g., using sending unit 1312) the selected suggested one or more characters to the first user.

In some embodiments, the processing unit 1304 is further configured to: detect (e.g., using detecting unit 1310) keyboard input representing one or more contacts on the virtual keyboard; in response to detecting the keyboard input: cease to display (e.g., using display ceasing unit 1314) the plurality of suggested one or more characters; and enable (e.g., using display enabling unit 1306) display of, in the third region, auto-correct information based on the keyboard input.

In some embodiments, the processing unit 1304 is further configured to: determine (e.g., using determining unit 1308) the plurality of suggested one or more characters based on at least one word used in the at least one message.

In some embodiments, the processing unit 1304 is further configured to: identify (e.g., using identifying unit 1316) a use of the word "or" in the at least one message; identify (e.g., using identifying unit 1316) a preceding word that appears immediately before the word "or"; and identify (e.g., using identifying unit 1316) a subsequent word that appears immediately after the word "or", wherein: enabling display of the plurality of suggested one or more characters comprises enabling display of at least the preceding word and the subsequent word.

In some embodiments, the processing unit 1304 is further configured to: determine (e.g., using determining unit 1308) the plurality of suggested one or more characters based on a punctuation mark used in the at least one message.

In some embodiments, the processing unit 1304 is further configured to: determine (e.g., using determining unit 1308) whether the at least one message contains an interrogatory sentence; and in accordance with a determination that the at least one message contains an interrogatory sentence, enable (e.g., using display enabling unit 1306) display of at least "yes" and "no" as part of the plurality of suggested one or more characters.

In some embodiments, the processing unit 1304 is further configured to: determine (e.g., using determining unit 1308) the plurality of suggested one or more characters based on at least the identity of the first user.

In some embodiments, the processing unit 1304 is further configured to: identify (e.g., using identifying unit 1316) the most-frequently-sent messages to the first user, wherein: displaying the plurality of suggested one or more characters comprises displaying the most-frequently-sent messages.

In some embodiments, the processing unit 1304 is further configured to: identify (e.g., using identifying unit 1316) the most-recently-sent messages to the first user, and wherein: displaying the plurality of suggested one or more characters comprises displaying at least one of the most-recently-sent messages.

In some embodiments, the processing unit 1304 is further configured to: determine (e.g., using determining unit 1308) the plurality of suggested one or more characters based on at least a location of the first user.

In some embodiments, the processing unit 1304 is further configured to: determine (e.g., using determining unit 1308) a location of the electronic device, and enable (e.g., using display enabling unit 1306) display of an affordance for sending the location as a message to the first user.

In some embodiments, the processing unit 1304 is further configured to: determine (e.g., using determining unit 1308) the plurality of suggested one or more characters based on at least one calendar entry stored in the electronic device.

In some embodiments, the processing unit 1304 is further configured to: obtain (e.g., using determining unit 1318) a calendar entry based on the message received from the first user; and enable (e.g., using display enabling unit 1306) display of an affordance for sending at least a portion of the obtained calendar entry as a message to the first user.

In some embodiments, the processing unit 1304 is further configured to: determine (e.g., using determining unit 1308) the plurality of suggested one or more characters based on at least an honorific used in the at least one message.

In some embodiments, the processing unit 1304 is further configured to: obtain (e.g., using determining unit 1318) a plurality of contact names stored on the electronic device; detect (e.g., using detecting unit 1310) the use of a contact name of the plurality of contact names in the at least one message; obtain (e.g., using determining unit 1318) contact information corresponding to the used contact name; and enable (e.g., using display enabling unit 1306) display of an affordance for sending at least a portion of the obtained contact information as a message to the second user.

In some embodiments, the processing unit 1304 is further configured to: enable (e.g., using display enabling unit 1306) display of an affordance for calling a phone number associated with the obtained contact information.

In some embodiments, the processing unit 1304 is further configured to: count (e.g., using counting unit 1320) the number of messages received from the first user within a time interval; and in accordance with a determination that the number exceeds a predetermined threshold, enable (e.g., using display enabling unit 1306) display of an affordance for calling the first user.

In some embodiments, the processing unit 1304 is further configured to: count (e.g., using counting unit 1320) the number of messages received from the first user within a time interval; and in accordance with a determination that the number exceeds a predetermined threshold, enable (e.g., using display enabling unit 1306) display of an affordance for video conferencing the first user.

In some embodiments, the processing unit 1304 is further configured to: rank (e.g., using ranking unit 1322) the suggested one or more characters; and enable (e.g., using display enabling unit 1306) display of the top-ranked characters in the center most position among the displayed suggested one or more characters.

In some embodiments, the plurality of suggested one or more characters comprises a first word or phrase, a second word or phrase, and a third word or phrase. In some embodiments, the plurality of suggested one or more characters consists of a first word or phrase, a second word or phrase, and a third word or phrase. In some embodiments, the plurality of suggested one or more characters comprises at least one emoji. In some embodiments, the at least one message is the most-recently-received message from the first user.

The operations described above with reference to FIG. 8 are, optionally, implemented by components depicted in FIGS. 1A-1B or FIG. 13. For example, displaying operation 802 and detecting operation 808 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 14:
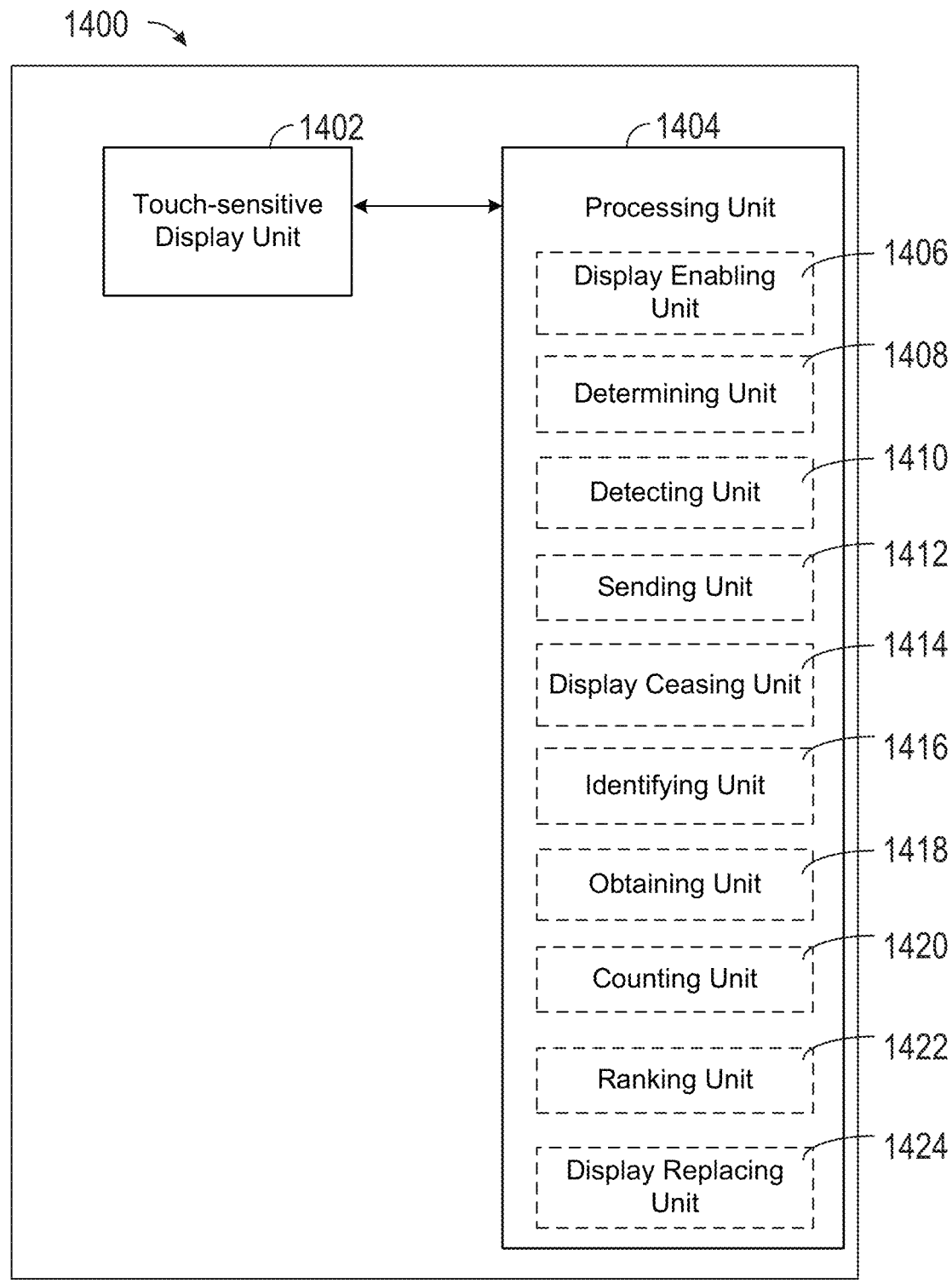

In accordance with some embodiments, FIG. 14 shows an exemplary functional block diagram of an electronic device 1400 configured in accordance with the principles of the various described embodiments. In accordance with some embodiments, the functional blocks of electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes a touch-sensitive display unit 1402 configured to display objects and to receive contacts and a processing unit 1404 coupled to the touch-sensitive display unit 1402. In some embodiments, the processing unit 1404 includes display enabling unit 1406, determining unit 1408, detecting unit 1410, sending unit 1412, display ceasing unit 1414, identifying unit 1416, obtaining unit 1418, counting unit 1420, ranking unit 1422, and display replacing unit 1424.

The processing unit 1404 is configured to: enable display (e.g., using display enabling unit 1406) of a message transcript, the message transcript including at least one message from at least a first user; determine (e.g., using determining unit 1408), based at least in-part on the at least one message, a plurality of suggested one or more characters; and enable display (e.g., using display enabling unit 1406) of a first suggested one or more characters of the plurality of suggested one or more characters in a first region on the touch-sensitive display unit, wherein the first region is a contiguous region visually distinguished from the background of the message transcript.

In some embodiments, the processing unit 1404 is further configured to: detect (e.g., using detecting unit 1410) input representing user selection of the first suggested one or more characters; and in response to detecting the input, send (e.g., using sending unit 1412) the suggested response to the first user.

In some embodiments, the processing unit 1404 is further configured to: enable display (e.g., using display enabling unit 1406) of a text input area; detect (e.g., using detecting unit 1410) input representing a contact on the text input area; and in response to detecting the input, enable display (e.g., using display enabling unit 1406) of a virtual keyboard, the virtual keyboard including a number of character keys.

In some embodiments, the processing unit 1404 is further configured to: detect (e.g., using detecting unit 1410) keyboard input representing one or more contacts on the virtual keyboard; and in response to detecting the keyboard input, cease to display (e.g., using display ceasing unit 1414) the first suggested one or more characters.

In some embodiments, the processing unit 1404 is further configured to: enable display (e.g., using display enabling unit 1406) of auto-correct information based on the keyboard input.

In some embodiments, the processing unit 1404 is further configured to: in response to detecting the input, cease to display the (e.g., using display ceasing unit 1414) first suggested one or more characters.

In some embodiments, the first region has a dashed outline.

In some embodiments, the processing unit 1404 is further configured to: detect (e.g., using detecting unit 1410) input representing user selection of the first suggested one or more characters; and in response to detecting the input, replace (e.g., using display replacing unit 1424) the dashed outline of the first region with a solid outline.

In some embodiments, the processing unit 1404 is further configured to: enable display (e.g., using display enabling unit 1406) of a second suggested one or more characters of the plurality of suggested one or more characters in a second region on the touch-sensitive display unit, wherein the second region is a contiguous region visually distinguished from the background of the message transcript and from the first region; detect (e.g., using detecting unit 1410) input representing user selection of the first suggested one or more characters; and, in response to detecting the input, cease to display (e.g., using display ceasing unit 1414) the second region and the second suggested one or more characters.

In some embodiments, the first region is a message bubble.

In some embodiments, the processing unit 1404 is further configured to: determine (e.g., using determining unit 1408) the plurality of suggested one or more characters based on at least one word used in the at least one message.

In some embodiments, the processing unit 1404 is further configured to: identify (e.g., using identifying unit 1416) a use of the word "or" in the at least one message; identify (e.g., using identifying unit 1416) a preceding word that appears immediately before the word "or"; and identify (e.g., using identifying unit 1416) a subsequent word that appears immediately after the word "or", wherein: enabling display of the plurality of suggested one or more characters comprises enabling display of at least the preceding word and the subsequent word.

In some embodiments, the processing unit 1404 is further configured to: determine (e.g., using determining unit 1408) the plurality of suggested one or more characters based on a punctuation mark used in the at least one message.

In some embodiments, the processing unit 1404 is further configured to: determine (e.g., using determining unit 1408) whether the at least one message contains an interrogatory sentence; and in accordance with a determination that the at least one message contains an interrogatory sentence, enable display (e.g., using display enabling unit 1406) of at least "yes" and "no" as part of the plurality of suggested one or more characters.

In some embodiments, the processing unit 1404 is further configured to: determine (e.g., using determining unit 1408) the plurality of suggested one or more characters based on at least the identity of the first user.

In some embodiments, the processing unit 1404 is further configured to: identify (e.g., using identifying unit 1416) the most-frequently-sent messages to the first user, wherein: enabling display of the plurality of suggested one or more characters comprises enabling display of the most-frequently-sent messages.

In some embodiments, the processing unit 1404 is further configured to: identify (e.g., using identifying unit 1416) the most-recently-sent messages to the first user, and wherein: enabling display of the plurality of suggested one or more characters comprises enabling display of at least one of the most-recently-sent messages.

In some embodiments, the processing unit 1404 is further configured to: determine (e.g., using determining unit 1408)

the plurality of suggested one or more characters based on at least a location of the first user.

In some embodiments, the processing unit 1404 is further configured to: determine (e.g., using determining unit 1408) a location of the electronic device, and enable display (e.g., using display enabling unit 1406) of an affordance for sending the location as a message to the first user.

In some embodiments, the processing unit 1404 is further configured to: determine (e.g., using determining unit 1408) the plurality of suggested one or more characters based on at least one calendar entry stored in the electronic device.

In some embodiments, the processing unit 1404 is further configured to: obtain (e.g., using obtaining unit 1418) a calendar entry based on the message received from the first user; and enable display (e.g., using display enabling unit 1406) of an affordance for sending at least a portion of the obtained calendar entry as a message to the first user.

In some embodiments, the processing unit 1404 is further configured to: determine (e.g., using determining unit 1408) the plurality of suggested one or more characters based on at least an honorific used in the at least one message.

In some embodiments, the processing unit 1404 is further configured to: obtain (e.g., using obtaining unit 1418) a plurality of contact names stored on the electronic device; detect (e.g., using detecting unit 1410) the use of a contact name of the plurality of contact names in the at least one message; obtain (e.g., using obtaining unit 1418) contact information corresponding to the used contact name; and enable display (e.g., using display enabling unit 1406) of an affordance for sending at least a portion of the obtained contact information as a message to the second user.

In some embodiments, the processing unit 1404 is further configured to: enable display (e.g., using display enabling unit 1406) of an affordance for calling a phone number associated with the obtained contact information.

In some embodiments, the processing unit 1404 is further configured to: count (e.g., using counting unit 1420) the number of messages received from the first user within a time interval; and, in accordance with a determination that the number exceeds a predetermined threshold, enable display (e.g., using display enabling unit 1406) of an affordance for calling the first user.

In some embodiments, the processing unit 1404 is further configured to: count (e.g., using counting unit 1420) the number of messages received from the first user within a time interval; and, in accordance with a determination that the number exceeds a predetermined threshold, enable display (e.g., using display enabling unit 1406) of an affordance for video conferencing the first user.

In some embodiments, the processing unit 1404 is further configured to: rank (e.g., using ranking unit 1422) the suggested one or more characters; and enable display (e.g., using display enabling unit 1406) of the top-ranked characters in the center most position among the displayed suggested one or more characters.

In some embodiments, the plurality of suggested one or more characters comprises a first word or phrase, a second word or phrase, and a third word or phrase. In some embodiments, the plurality of suggested one or more characters consists of a first word or phrase, a second word or phrase, and a third word or phrase. In some embodiments, the plurality of suggested one or more characters comprises at least one emoji. In some embodiments, the at least one message is the most-recently-received message from the first user.

The operations described above with reference to FIG. 9 are, optionally, implemented by components depicted in FIGS. 1A-1B or FIG. 14. For example, displaying operation 902, determining operation 904, and detecting operation 908 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 15:
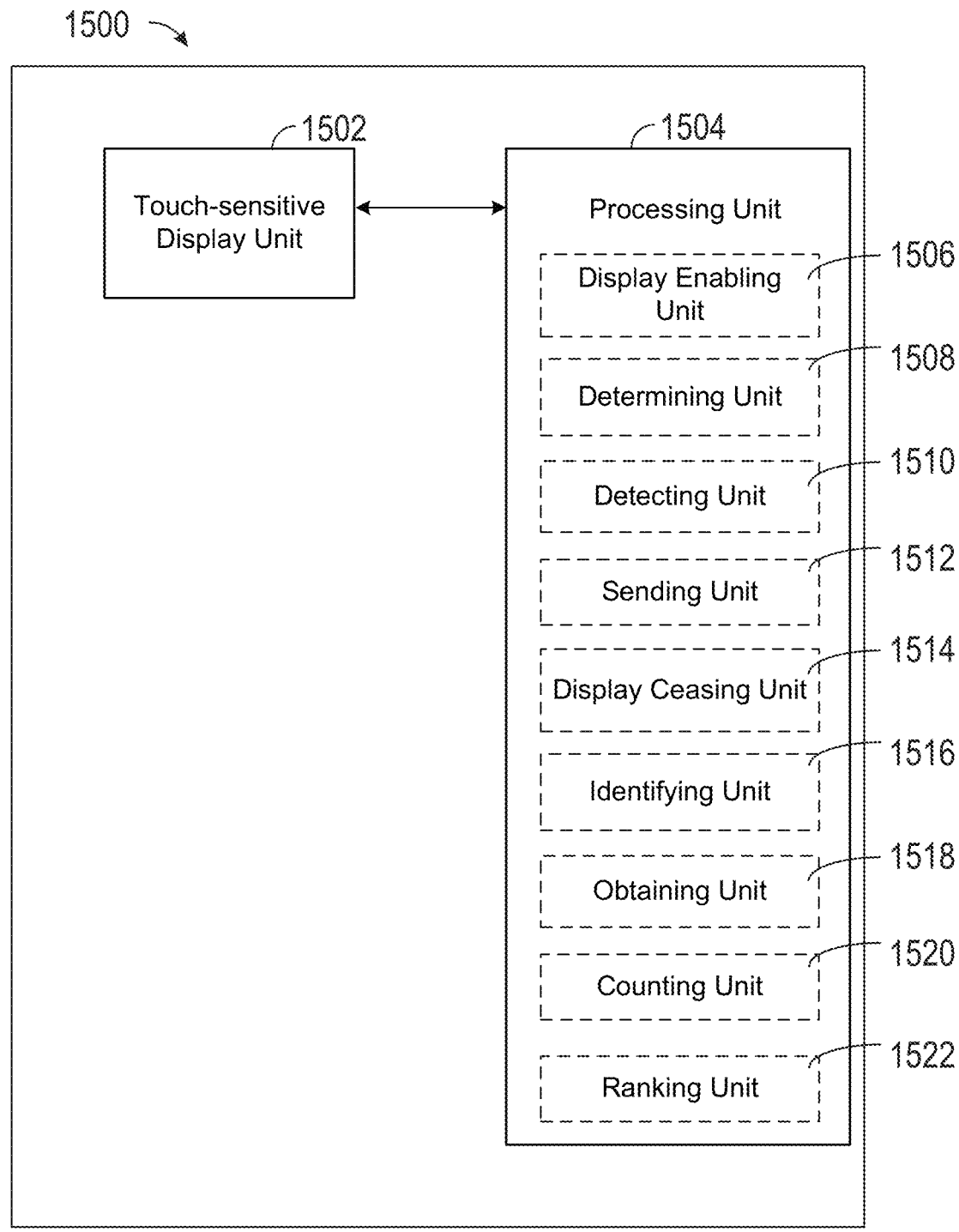

In accordance with some embodiments, FIG. 15 shows an exemplary functional block diagram of an electronic device 1500 configured in accordance with the principles of the various described embodiments. In accordance with some embodiments, the functional blocks of electronic device 1500 are configured to perform the techniques described above. The functional blocks of the device 1500 are, optionally, implemented by hardware, software, or a combination of hardware and software to carry out the principles of the various described examples. It is understood by persons of skill in the art that the functional blocks described in FIG. 15 are, optionally, combined or separated into sub-blocks to implement the principles of the various described examples. Therefore, the description herein optionally supports any possible combination or separation or further definition of the functional blocks described herein.

As shown in FIG. 15, an electronic device 1500 includes a touch-sensitive display unit 1502 configured to display a graphic user interface and to receive contacts, and a processing unit 1504 coupled to the touch-sensitive display unit 1502. In some embodiments, the processing unit 1504 includes a display enabling unit 1506, determining unit 1508, detecting unit 1510, sending unit 1512, display ceasing unit 1514, identifying unit 1516, obtaining unit 1518, counting unit 1520, and ranking unit 1522.

The processing unit 1504 is configured to: enable (e.g., using display enabling unit 1506) display of a message transcript, the message transcript including at least one message from at least a first user; determine (e.g., using determining unit 1508), based at least in-part on the at least one message, a plurality of suggested one or more characters; and enable display (e.g., using display enabling unit 1506) of a first affordance representing a first suggested one or more characters of the plurality of suggested one or more characters at the bottom of the message transcript.

In some embodiments, the processing unit 1504 is further configured to: detect (e.g., using detecting unit 1510) input representing user selection of the first affordance; and, in response to detecting the input, send (e.g., using sending unit 1512) the first suggested response to the first user.

In some embodiments, the processing unit 1504 is further configured to: in response to detecting the input, enable display (e.g., using display enabling unit 1506) of the first suggested one or more characters in the message transcript.

In some embodiments, the processing unit 1504 is further configured to: in response to detecting the input, enable display (e.g., using display enabling unit 1506) of the first suggested one or more characters in a first region of the message transcript, wherein the first region is a contiguous region visually distinguished from the background of the message transcript.

In some embodiments, the processing unit 1504 is further configured to: in response to detecting the input, cease to display (e.g., using display ceasing unit 1514) the first suggested one or more characters.

In some embodiments, the processing unit 1504 is further configured to: enable display (e.g., using display enabling unit 1506) of a second affordance representing a second suggested one or more characters of the plurality of suggested one or more characters; detect (e.g., using detecting unit 1510) input representing user selection of the first affordance; and, in response to detecting the input, cease to display (e.g., using display ceasing unit 1514) the second affordance.

In some embodiments, the first region is a message bubble.

In some embodiments, the processing unit 1504 is further configured to: determine (e.g., using determining unit 1508) the plurality of suggested one or more characters based on at least one word used in the at least one message.

In some embodiments, the processing unit 1504 is further configured to: identify (e.g., using identifying unit 1516) a use of the word "or" in the at least one message; identify (e.g., using identifying unit 1516) a preceding word that appears immediately before the word "or"; and identify (e.g., using identifying unit 1516) a subsequent word that appears immediately after the word "or", wherein: enabling display of the plurality of suggested one or more characters comprises enabling display of at least the preceding word and the subsequent word.

In some embodiments, the processing unit 1504 is further configured to: determine (e.g., using determining unit 1508) the plurality of suggested one or more characters based on a punctuation mark used in the at least one message.

In some embodiments, the processing unit 1504 is further configured to: determine (e.g., using determining unit 1508) whether the at least one message contains an interrogatory sentence; and, in accordance with a determination that the at least one message contains an interrogatory sentence, enable display (e.g., using display enabling unit 1506) of at least "yes" and "no" as part of the plurality of suggested one or more characters.

In some embodiments, the processing unit 1504 is further configured to: determine (e.g., using determining unit 1508) the plurality of suggested one or more characters based on at least the identity of the first user.

In some embodiments, the processing unit 1504 is further configured to: identify (e.g., using identifying unit 1516) the most-frequently-sent messages to the first user, wherein: enabling display of the plurality of suggested one or more characters comprises enabling display of the most-frequently-sent messages.

In some embodiments, the processing unit 1504 is further configured to: identify (e.g., using identifying unit 1516) the most-recently-sent messages to the first user, and wherein: enabling display of the plurality of suggested one or more characters comprises enabling display of at least one of the most-recently-sent messages.

In some embodiments, the processing unit 1504 is further configured to: determine (e.g., using determining unit 1508) the plurality of suggested one or more characters based on at least a location of the first user.

In some embodiments, the processing unit 1504 is further configured to: determine (e.g., using determining unit 1508) a location of the electronic device, and enable display (e.g., using display enabling unit 1506) of an affordance for sending the location as a message to the first user.

In some embodiments, the processing unit 1504 is further configured to: determine (e.g., using determining unit 1508) the plurality of suggested one or more characters based on at least one calendar entry stored in the electronic device.

In some embodiments, the processing unit 1504 is further configured to: obtain (e.g., using obtaining unit 1518) a calendar entry based on the message received from the first user; and enable display (e.g., using display enabling unit 1506) of an affordance for sending at least a portion of the obtained calendar entry as a message to the first user.

In some embodiments, the processing unit 1504 is further configured to: determine (e.g., using determining unit 1508) the plurality of suggested one or more characters based on at least an honorific used in the at least one message.

In some embodiments, the processing unit 1504 is further configured to: obtain (e.g., using obtaining unit 1518) a plurality of contact names stored on the electronic device; detect (e.g., using detecting unit 1510) the use of a contact name of the plurality of contact names in the at least one message; obtain (e.g., using obtaining unit 1518) contact information corresponding to the used contact name; and enable display (e.g., using display enabling unit 1506) of an affordance for sending at least a portion of the obtained contact information as a message to the second user.

In some embodiments, the processing unit 1504 is further configured to: enable display (e.g., using display enabling unit 1506) of an affordance for calling a phone number associated with the obtained contact information.

In some embodiments, the processing unit 1504 is further configured to: count (e.g., using counting unit 1520) the number of messages received from the first user within a time interval; and in accordance with a determination that the number exceeds a predetermined threshold, enable display (e.g., using display enabling unit 1506) of an affordance for calling the first user.

In some embodiments, the processing unit 1504 is further configured to: count (e.g., using counting unit 1520) the number of messages received from the first user within a time interval; and, in accordance with a determination that the number exceeds a predetermined threshold, enable display (e.g., using display enabling unit 1506) of an affordance for video conferencing the first user.

In some embodiments, the processing unit 1504 is further configured to: rank (e.g., using ranking unit 1522) the suggested one or more characters; and enable display (e.g., using display enabling unit 1506) of the top-ranked characters in the center most position among the displayed suggested one or more characters.

In some embodiments, the plurality of suggested one or more characters comprises a first word or phrase, a second word or phrase, and a third word or phrase. In some embodiments, the plurality of suggested one or more characters consists of a first word or phrase, a second word or phrase, and a third word or phrase. In some embodiments, the plurality of suggested one or more characters comprises at least one emoji. In some embodiments, the at least one message is the most-recently-received message from the first user.

The operations described above with reference to FIG. 10 are, optionally, implemented by components depicted in FIGS. 1A-1B or FIG. 15. For example, displaying operation 1002, determining operation 1004, and detecting operation 1008 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a touch-sensitive display;
   one or more processors;
   a memory; and
   one or more programs, wherein the one or more programs are stored in the memory and configured to be executed by the one or more processors, the one or more programs including instructions for:
      displaying a first user interface, the first user interface concurrently displaying:
         a message transcript in a first region of the display, the message transcript including a first message from at least a second electronic device different from the electronic device; and
         a virtual keyboard in a second region of the display, the virtual keyboard including a number of character keys;
      while displaying the first user interface, receiving a second message from the second electronic device;
      in response to receiving the second message from the second electronic device, displaying a plurality of suggested one or more characters in a third region of the display, the plurality of suggested one or more characters is determined based, at least in-part, on a content of the second message received from the second electronic device, wherein the third region is displayed concurrently with the first and second regions;
      detecting a set of one or more inputs that includes an input representing user selection of a suggested one or more characters from the displayed plurality of suggested one or more characters; and
      in response to detecting the set of one or more inputs, displaying the selected suggested one or more characters in the message transcript in the first region of the display.

2. The electronic device of claim 1, wherein displaying the selected suggested one or more characters in the message transcript in the first region of the display includes
   sending the selected suggested one or more characters to the second electronic device.

3. The electronic device of claim 1, the one or more programs further including instructions for:
   while displaying the first user interface that concurrently includes the first region, second region, and the third region, detecting a keyboard input representing one or more contacts on a virtual keyboard; and
   in response to detecting the keyboard input, replacing the plurality of suggested one or more characters in the third region with a plurality of auto-correct suggestions based on the keyboard input.

4. The electronic device of claim 1, the one or more programs further including instructions for:
   determining the plurality of suggested one or more characters based on at least one word used in the second message.

5. The electronic device of claim 1, the one or more programs further including instructions for:
   identifying a use of a word "or" in the second message;
   identifying a preceding word that appears immediately before the word "or"; and
   identifying a subsequent word that appears immediately after the word "or", wherein:
      displaying the plurality of suggested one or more characters comprises displaying at least the preceding word and the subsequent word.

6. The electronic device of claim 5, wherein the second message includes an interrogatory, the one or more programs further including instructions for:
   determining a word or phrase that is responsive to the interrogatory, wherein the word or phrase is different from the preceding word and the subsequent word; and
   displaying the plurality of suggested one or more characters comprises the word or phrase that is responsive to the interrogatory.

7. The electronic device of claim 1, the one or more programs further including instructions for:
   determining the plurality of suggested one or more characters based on a punctuation mark used in the second message.

8. The electronic device of claim 1, the one or more programs further including instructions for:
   determining whether the second message contains an interrogatory sentence; and
   in accordance with a determination that the second message contains an interrogatory sentence, displaying at least "yes" and "no" as part of the plurality of suggested one or more characters.

9. The electronic device of claim 1, the one or more programs further including instructions for:
   determining the plurality of suggested one or more characters based on at least a location of the second electronic device.

10. The electronic device of claim 1, the one or more programs further including instructions for:
    determining a location of the electronic device, and
    displaying an affordance for sending the location as a message to the second electronic device.

11. The electronic device of claim 1, the one or more programs further including instructions for:
    determining the plurality of suggested one or more characters based on at least one calendar entry stored in the electronic device.

12. The electronic device of claim 1, the one or more programs further including instructions for:
    obtaining a calendar entry based on the message received from the second electronic device; and
    displaying an affordance for sending at least a portion of the obtained calendar entry as a message to the second electronic device.

13. The electronic device of claim 1, the one or more programs further including instructions for:
    determining the plurality of suggested one or more characters based on at least an honorific used in the second message.

14. The electronic device of claim 1, the one or more programs further including instructions for:
    obtaining a plurality of contact names stored on the electronic device;
    detecting the use of a contact name of the plurality of contact names in the second message;
    obtaining contact information corresponding to the used contact name; and
    displaying an affordance for sending at least a portion of the obtained contact information as a message to a second user.

15. A method comprising:
    at an electronic device with a touch-sensitive display:
        displaying a first user interface, the first user interface concurrently displaying:
            a message transcript in a first region of the display, the message transcript including a first message from at least a second electronic device different from the electronic device; and
            a virtual keyboard in a second region of the display, the virtual keyboard including a number of character keys;
        while displaying the first user interface, receiving a second message from the second electronic device;
        in response to receiving the second message from the second electronic device, displaying a plurality of suggested one or more characters in a third region of the display, the plurality of suggested one or more characters is determined based, at least in-part, on a content of the second message received from the second electronic device, wherein the third region is displayed concurrently with the first and second regions;
        detecting a set of one or more inputs that includes an input representing user selection of a suggested one or more characters from the displayed plurality of suggested one or more characters; and
        in response to detecting the set of one or more inputs, displaying the selected suggested one or more characters in the message transcript in the first region of the display.

16. The method of claim 15, wherein displaying the selected suggested one or more characters in the message transcript in the first region of the display includes sending the selected suggested one or more characters to the second electronic device.

17. The method of claim 15, further comprising:
    while displaying the first user interface that concurrently includes the first region, second region, and the third region, detecting a keyboard input representing one or more contacts on a virtual keyboard; and
    in response to detecting the keyboard input, replacing the plurality of suggested one or more characters in the third region with a plurality of auto-correct suggestions based on the keyboard input.

18. The method of claim 15, further comprising:
    determining the plurality of suggested one or more characters based on at least one word used in the second message.

19. The method of claim 15, further comprising:
    identifying a use of a word "or" in the second message;
    identifying a preceding word that appears immediately before the word "or"; and
    identifying a subsequent word that appears immediately after the word "or", wherein:
        displaying the plurality of suggested one or more characters comprises displaying at least the preceding word and the subsequent word.

20. The method of claim 19, wherein the second message includes an interrogatory, further comprising:
    determining a word or phrase that is responsive to the interrogatory, wherein the word or phrase is different from the preceding word and the subsequent word; and
    displaying the plurality of suggested one or more characters comprises the word or phrase that is responsive to the interrogatory.

21. The method of claim 15, further comprising:
    determining the plurality of suggested one or more characters based on a punctuation mark used in the second message.

22. The method of claim 15, further comprising:
    determining whether the second message contains an interrogatory sentence; and
    in accordance with a determination that the second message contains an interrogatory sentence, displaying at least "yes" and "no" as part of the plurality of suggested one or more characters.

23. The method of claim 15, further comprising:
    determining the plurality of suggested one or more characters based on at least a location of the second electronic device.

24. The method of claim 15, further comprising:
    determining a location of the electronic device, and
    displaying an affordance for sending the location as a message to the second electronic device.

25. The method of claim 15, further comprising:
    determining the plurality of suggested one or more characters based on at least one calendar entry stored in the electronic device.

26. The method of claim 15, further comprising:
    obtaining a calendar entry based on the message received from the second electronic device; and
    displaying an affordance for sending at least a portion of the obtained calendar entry as a message to the second electronic device.

27. The method of claim 15, further comprising:
    determining the plurality of suggested one or more characters based on at least an honorific used in the second message.

28. The method of claim 15, further comprising:
    obtaining a plurality of contact names stored on the electronic device;
    detecting the use of a contact name of the plurality of contact names in the second message;
    obtaining contact information corresponding to the used contact name; and displaying an affordance for sending at least a portion of the obtained contact information as a message to a second user.

29. A non-transitory computer-readable storage medium storing one or more programs configured to be executed by one or more processors of an electronic device with a display, the one or more programs including instructions for:
  displaying a first user interface, the first user interface concurrently displaying:
    a message transcript in a first region of the display, the message transcript including a first message from at least a second electronic device different from the electronic device; and
    a virtual keyboard in a second region of the display, the virtual keyboard including a number of character keys;
  while displaying the first user interface, receiving a second message from the second electronic device;
  in response to receiving the second message from the second electronic device, displaying a plurality of suggested one or more characters in a third region of the display, the plurality of suggested one or more characters is determined based, at least in-part, on a content of the second message received from the second electronic device, wherein the third region is displayed concurrently with the first and second regions;
  detecting a set of one or more inputs that includes an input representing user selection of a suggested one or more characters from the displayed plurality of suggested one or more characters; and
  in response to detecting the set of one or more inputs, displaying the selected suggested one or more characters in the message transcript in the first region of the display.

30. The non-transitory computer-readable storage medium of claim 29, wherein displaying the selected suggested one or more characters in the message transcript in the first region of the display includes
  sending the selected suggested one or more
characters to the second electronic device.

31. The non-transitory computer-readable storage medium of claim 29, the one or more programs further including instructions for:
  while displaying the first user interface that concurrently includes the first region, second region, and the third region, detecting a keyboard input representing one or more contacts on a virtual keyboard; and
  in response to detecting the keyboard input, replacing the plurality of suggested one or more characters in the third region with a plurality of auto-correct suggestions based on the keyboard input.

32. The non-transitory computer-readable storage medium of claim 29, the one or more programs further including instructions for:
  determining the plurality of suggested one or more characters based on at least one word used in the second message.

33. The non-transitory computer-readable storage medium of claim 29, the one or more programs further including instructions for:
  identifying a use of a word "or" in the second message;
  identifying a preceding word that appears immediately before the word "or"; and
  identifying a subsequent word that appears immediately after the word "or", wherein:
    displaying the plurality of suggested one or more characters comprises displaying at least the preceding word and the subsequent word.

34. The non-transitory computer-readable storage medium of claim 33, wherein the second message includes an interrogatory, the one or more programs further including instructions for:
  determining a word or phrase that is responsive to the interrogatory, wherein the word or phrase is different from the preceding word and the subsequent word; and
  displaying the plurality of suggested one or more characters comprises the word or phrase that is responsive to the interrogatory.

35. The non-transitory computer-readable storage medium of claim 29, the one or more programs further including instructions for:
  determining the plurality of suggested one or more characters based on a punctuation mark used in the second message.

36. The non-transitory computer-readable storage medium of claim 29, the one or more programs further including instructions for:
  determining whether the second message contains an interrogatory sentence; and
  in accordance with a determination that the second message contains an interrogatory sentence, displaying at least "yes" and "no" as part of the plurality of suggested one or more characters.

37. The non-transitory computer-readable storage medium of claim 29, the one or more programs further including instructions for:
  determining the plurality of suggested one or more characters based on at least a location of the second electronic device.

38. The non-transitory computer-readable storage medium of claim 29, the one or more programs further including instructions for:
  determining a location of the electronic device, and
  displaying an affordance for sending the location as a message to the second electronic device.

39. The non-transitory computer-readable storage medium of claim 29, the one or more programs further including instructions for:
  determining the plurality of suggested one or more characters based on at least one calendar entry stored in the electronic device.

40. The non-transitory computer-readable storage medium of claim 29, the one or more programs further including instructions for:
  obtaining a calendar entry based on the message received from the second electronic device; and
  displaying an affordance for sending at least a portion of the obtained calendar entry as a message to the second electronic device.

41. The non-transitory computer-readable storage medium of claim 29, the one or more programs further including instructions for:
  determining the plurality of suggested one or more characters based on at least an honorific used in the second message.

42. The non-transitory computer-readable storage medium of claim 29, the one or more programs further including instructions for:
  obtaining a plurality of contact names stored on the electronic device;
  detecting the use of a contact name of the plurality of contact names in the second message;

obtaining contact information corresponding to the used contact name; and displaying an affordance for sending at least a portion of the obtained contact information as a message to a second user.

* * * * *